United States Patent [19]
Davis et al.

[11] Patent Number: 6,009,487
[45] Date of Patent: *Dec. 28, 1999

[54] METHOD AND APPARATUS FOR SETTING A CURRENT OF AN OUTPUT DRIVER FOR THE HIGH SPEED BUS

[75] Inventors: Paul Gregory Davis, San Jose; Pradeep Batra, Santa Clara; John B. Dillon, Palo Alto; Karnamadakala Krishnamohan, San Jose; James A. Gasbarro, Mountain View, all of Calif.

[73] Assignee: Rambus Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,830

[22] Filed: May 31, 1996

[51] Int. Cl.$^6$ .................................................. G06F 13/42

[52] U.S. Cl. .............................. 710/105; 326/30; 326/86; 710/107

[58] Field of Search ................................. 326/30, 86, 33, 326/90, 68, 81; 395/287, 290, 309, 284, 285, 310

[56] References Cited

U.S. PATENT DOCUMENTS

| | | | |
|---|---|---|---|
| 4,200,863 | 4/1980 | Hodges et al. | 340/347 |
| 4,247,817 | 1/1981 | Heller | 324/73 |
| 4,473,762 | 9/1984 | Iwahashi et al. | 307/594 |
| 4,481,625 | 11/1984 | Roberts et al. | 370/85 |
| 4,519,034 | 5/1985 | Smith et al. | 364/200 |
| 4,785,394 | 11/1988 | Fischer | 364/200 |
| 4,811,202 | 3/1989 | Schabowski | 364/200 |
| 4,860,198 | 8/1989 | Tanenaka | 364/200 |
| 5,023,488 | 6/1991 | Gunning | 307/475 |
| 5,194,765 | 3/1993 | Dunlop et al. | 307/443 |
| 5,254,883 | 10/1993 | Horowitz et al. | 307/443 |
| 5,475,336 | 12/1995 | Singh et al. | 327/543 |
| 5,585,741 | 12/1996 | Jordan | 326/30 |
| 5,592,076 | 1/1997 | Main et al. | 323/315 |
| 5,663,674 | 9/1997 | Beyer et al. | 327/540 |

FOREIGN PATENT DOCUMENTS

| | | |
|---|---|---|
| 0 463 316 A1 | 1/1992 | European Pat. Off. . |
| 482392A2 | 4/1992 | European Pat. Off. . |
| 9116680 | 10/1991 | WIPO . |

OTHER PUBLICATIONS

Arnold O. Allen, *Probability, Statistics, and queueing Theory With Computer Science Applications*, Second Edition, Academic Press, Inc., pp. 450, 458–459,. (Nov. 1990).

Harold Pilo, Steve Lamphier, Fred Towler, Richard Hee, *A 300 MHz, 3.3V 1Mb SRAM Fabricated in a 0.5μm CMOS Process*, IBM Microelectronics Division, Essex Junction, VT, pp.148–149, 1996 IEEE International Solid–State Circuits Conference (Feb. 9,1996).

PCT International Search Report, PCT/US 97/09219, dated Jun.10,1997.

(List continued on next page.)

*Primary Examiner*—Ayaz R. Sheikh
*Assistant Examiner*—Raymond N Phan
*Attorney, Agent, or Firm*—Blakely, Sokoloff, Taylor & Zafman LLP

[57] ABSTRACT

In a system comprising a current controlling device and a plurality of signal lines coupled to the current controlling device, wherein the current controlling device has an output driver including a register, an improved method for setting a current of the output driver for at least one of the plurality of signal lines. The improved method determines a reference register-setting for the register of the current controlling device. The reference register-setting corresponds to a reference voltage for at least one of the plurality of signal lines. A target register-setting is then determined for the register based on the reference register-setting. The target register-setting corresponds to a target voltage for at least one of the plurality of signal lines, wherein the target voltage produces an appropriate swing about the reference voltage. An operational register-setting is then determined for the register based on the target register-setting. The current of the output driver for at least one of the plurality of signal lines is then set based on the operational register-setting so that a swing about the reference voltage is optimal.

55 Claims, 12 Drawing Sheets

OTHER PUBLICATIONS

T. Yang, M. Horowitz, and B. Wooley, "A 4–ns 4K×1–bit Two Port BiCMOS SRAM", IEEE Journal of Solid State Circuits, vol. 23, No. 5, pp. 1030–40 (Oct. 1988).

T. Chappell, et al., "A2ns Cycle, 4ns Access 512kb CMOS ECL SRAM", IEEE International Solid–State Circuits Conference, pp. 50–51 (1991).

Translated Abstract of Japanese patent application No. 58–54412, vol. 7, No. 138 (P–204) (1283) Jun. 16, 1983.

H. Shumacher, J. Dikken, and E. Seevinck, "CMOS Sub-nanosecond True–ECL Output Buffer", IEEE Journal of Solid–State Circuits, vol. 25, No. 1, pp. 148–154 (Feb. 1990).

6,009,487

METHOD AND APPARATUS FOR SETTING A CURRENT OF AN OUTPUT DRIVER FOR THE HIGH SPEED BUS

FIELD OF THE INVENTION

The present invention pertains to the field of electrical buses. More particularly, the present invention relates to a method for setting a current of a current source driver for a high speed bus system.

BACKGROUND OF THE INVENTION

Computer systems and other electronic systems typically use buses for interconnecting integrated circuit components so that the integrated circuit components can communicate with one another. The buses typically connect masters such as microprocessors and controllers and slaves such as memories and bus transceivers.

Each master and slave coupled to a bus typically includes output driver circuitry for driving signals onto the bus. The output driver circuitry may comprise a current mode output driver. A current mode driver draws a known current regardless of load and operating conditions and has a high output impedance.

An example of a current mode output driver for use in a master or slave device is disclosed in U.S. Pat. No. 5,254,883, issued Oct. 19, 1993, of Horowitz et al. ("Horowitz"), entitled *Electrical Current Source Circuitry for a Bus*. Horowitz describes a process for calibrating a register-setting for a register in a current controller of a current mode output driver. The process determines a register-setting that causes an output driver to produce a bus voltage approximately equal to a reference voltage. The process sends an initial register-setting from the master to the slave. The initial register-setting induces a voltage VOL on a particular transmission line of a current mode bus by coupling selective ones of a plurality of capacitors to the output of a current mirror of the output driver. The master measures VOL on the one transmission line one time, and compares VOL with a reference voltage Vref. If VOL is greater than Vref, the initial register-setting is updated and the process is repeated until a register-setting is achieved which results in VOL being less than or equal to Vref.

One disadvantage of Horowitz is that in determining the register-setting, errors may be introduced in the process resulting in a suboptimal register-setting. For example, Horowitz describes measuring VOL on one transmission line one time. A calibrated register-setting based on this measurement is then used to set the register-setting for each output driver in a slave. Practically, variations exist between output drivers in a slave device such that a register-setting based on the measured voltage of one transmission line may not necessarily result in the correct register-setting for another transmission line.

Additionally variations between comparison circuits in the master, variations in the reference and circuit voltages in the master and the slave, and variations in bus termination may also cause errors in the register setting process disclosed in Horowitz.

Another disadvantage of Horowitz is that for the process for determining a register-setting, errors may be introduced as a result of small time-dependent variations in the measured bus voltage VOL. Thus, VOL will not stabilize on the bus until after a certain amount of time. The time-dependent variations in VOL are due to transmission line effects caused by bus impedance variations and non-linear effects of output transistors of the slave coupled to the bus. These variations may be significant enough to adversely affect the comparison of VOL with Vref if the comparison occurs before the time-dependent variations in VOL have stabilized. Additionally, small voltage variations on the bus induced by nearby electrical components within or outside of the system may contribute to errors in the comparison of VOL with Vref, and consequently result in an erroneous determination of the register-setting.

Horowitz further describes that the register-setting is doubled in order to achieve a symmetric voltage swing about Vref. A simple doubling of the register-setting would suffice if the output transistors were ideal linear current sources; however, practical transistor devices have finite output impedance. These transistor characteristics can cause the doubled register-setting to induce a bus voltage on the bus that does not achieve symmetry about Vref with a sufficient degree of accuracy.

Another disadvantage of the process of Horowitz is that the process depends upon a fixed relationship between the register-setting, the selection of a plurality of capacitors, and the time to charge the selected capacitors. Practically, there is additional capacitance in the current controller circuitry due to parasitic capacitance of the plurality of capacitors and other stray effects as well as non-linearities at the beginning of circuit operation. These combined effects result in a register-setting having a small positive offset. Therefore, simply doubling the register-setting having the small positive offset may not result in a symmetric voltage swing about Vref.

SUMMARY AND OBJECTS OF THE INVENTION

One object of the present invention is to provide an improved method for setting a current of a current source driver for a bus.

Another object of the present invention is to provide an improved method for setting a current of a current source driver for a bus, wherein a final operational register-setting is determined that provides a symmetric voltage swing about a reference voltage.

Another object of the present invention is to provide an improved method for setting a current of a current source driver for a bus, wherein the improved method provides a continuous stream of samples of which only a portion, which are considered to be stable, are used to determine a final operational register-setting.

Another object of the present invention is to provide an improved method for setting a current of a current source driver for a bus, wherein a final operational register-setting is determined by taking samples from multiple transmission lines of a bus to account for differences between output drivers of the slave and comparison circuits of the master.

Another object of the present invention is to provide an improved method for setting a current of a current source driver for a bus, wherein a final operational register-setting is determined by taking multiple samples from multiple transmission lines to account for induced noise and other variations that are not correlated with the bus operation.

Another object of the present invention is to provide an improved method for setting a current of a current source driver for a bus, wherein a final operational register-setting is determined which takes into account non-ideal transistor characteristics in the current source driver.

Another object of the present invention is to provide an improved method for setting a current of a current source driver for a bus, wherein a final operational register-setting is determined which takes into account the parasitic and stray effects of capacitors and other circuit elements in the current source driver.

Another object of the present invention is to provide an improved method for setting a current of a current source driver for a bus, wherein a final operational register-setting is determined using direct control circuitry, assertion circuitry, and read circuitry coupled to a current source driver.

In a system comprising a current controlling device and a plurality of signal lines coupled to the current controlling device, wherein the current controlling device has an output driver including a register, an improved method for setting a current of the output driver for at least one of the plurality of signal lines is described. The improved method determines a reference register-setting for the register of the current controlling device. A target register-setting is then determined for the register based on the reference register-setting. An operational register-setting is then determined for the register based on the target register-setting. The current of the output driver for one of the plurality of signal lines is then set based on the operational register-setting for the register of the current controlling device.

The improved method further comprises determining a plurality of possible operational register-settings based on a plurality of target register-settings determined from a plurality of reference register-settings. The plurality of possible operational register-settings is then used to determine an operational register-setting for the register of the current controlling device.

Other objects, features, and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
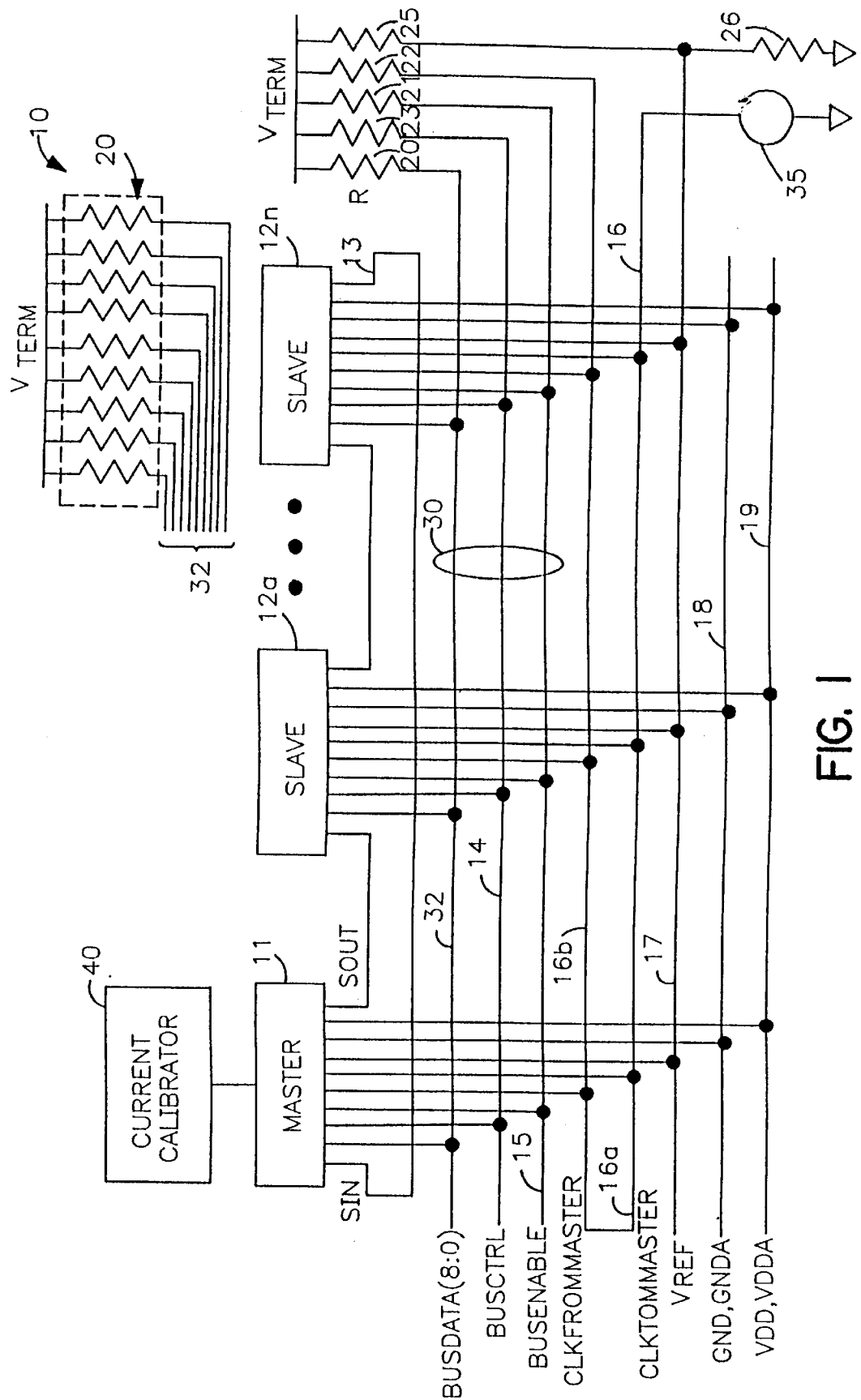
FIG. 1 is a block diagram of a bus system including a current calibrator, a master, a plurality of slaves and a bus.

FIG. 1 is a block diagram of a bus system 10. Bus system 10 includes a bus 30 coupled to master 11 and a plurality of slaves 12a–12n. Bus system 10 further includes current calibrator 40 coupled to master 11. Bus 30 is a high speed, low voltage swing bus that comprises a total of eleven lines for transferring data between master 11 and the slaves 12a–12n.

Master 11 and each of the slaves 12a–12n includes an interface circuit for coupling its respective master or slave to bus 30. The interface circuit includes a plurality of current mode drivers for driving bus 30. The current mode drivers are also referred to as output drivers or electrical current sources. For each master and slave, there is one output driver for each transmission line of bus 30. Each of the current mode drivers accurately provides a desired current for the respective signal line of bus 30.

As described in more detail below, each of the current mode drivers includes a plurality of transistors and a logic circuit coupled to the gates of the plurality of transistors. A current controller is coupled to the logic circuit for controlling the logic circuit in order to turn on or off a particular combination of the plurality of transistors. For one embodiment, the current controller includes a plurality of capacitors, a comparator, a counter and a register that receives a register-setting.

For one embodiment, a reference register-setting is determined. The reference register-setting is a value that when loaded into the register of the current controller causes the current mode driver to set a current and generate a voltage on the bus that is approximately equal to a reference voltage. A target register-setting is then determined based on the reference register-setting. The target register-setting is a value that, when loaded into the register of the current controller causes the current mode driver to set a current and generate an operational VOL voltage on a signal line of the bus. A VOH voltage is generated on a signal line of the bus when the plurality of transistors are turned off. The reference voltage is approximately midway between the operational VOL and VOH voltages. An operational register-setting is then determined for the register of the current controller. The operational register-setting is determined based on the target register-setting.

Master 11 generates requests, and for one embodiment, master 11 is a microprocessor. For another embodiment, master 11 is a digital signal processor, DMA controller, graphics controller or other type of controller device.

Slaves 12a–12n may comprise DRAMs or other types of memories, such as EPROMs, flash EPROMs, RAMs, static RAMs (SRAMs), and video RAMs (VRAMs) or other types of devices. For another embodiment, slaves 12a–12n are bus transceivers.

For one embodiment, system 10 may have multiple masters. For another embodiment, system 10 may have all masters and no slaves, or all slaves and no masters. For yet another embodiment, functions performed by master 11 may be performed by one of slaves 12a–12n or by a plurality of slaves 12a–12n. For yet another embodiment, functions performed by one of slaves 12a–12n or by a plurality of slaves 12a–12n may be performed by master 11.

In FIG. 1, master 11 and each of slaves 12a–12n are coupled to BusData [8:0] transmission lines 32, BusCtrl line 14, BusEnable line 15, ClkFromMaster line 16b, ClkToMaster line 16a and reference voltage line 17. Reference voltage line 17 couples Vref to master 11 and each of slaves 12a–12n. For one embodiment, Vref is generated by resistors 25 and 26 coupled as a voltage divider between ground and Vterm. For one embodiment, the termination voltage Vterm is approximately 2.5 volts. For one embodiment, Vref is approximately 2.0 volts.

BusData [8:0] comprise nine matched transmission lines each having controlled impedance and terminated on one end by a termination resistor R. The nine termination resistors are collectively referred to as termination resistors 20. Termination resistors 20 are coupled to Vterm. BusCtrl line 14 is terminated by termination resistor 23 coupled to Vterm. BusEnable line 15 is terminated by termination resistor 21 coupled to Vterm. CLkFromMaster line 16b and ClkToMaster line 16a are coupled to clock 35 and terminated by termination resistor 22 coupled to Vterm.

Master 11 and each of slaves 12a–12n also includes GND and GNDA ground pins coupled to line 18, and VDD and VDDA power supply pins coupled to line 19. For one embodiment, power supply voltages VDD and VDDA are each five volts. For another embodiment, power supply voltages VDD and VDDA are each 3.3 volts. Master 11 and each of the slaves 12a–12n also includes an SIn pin and an SOut pin which are coupled in a daisy chain configuration by line 13.

Current calibrator 40 comprises logic and/or circuitry necessary to implement a method for setting a current of the current mode drivers for driving bus 30 (to be described in more detail below). The improved method determines a register-setting for the current mode drivers in master 11 and/or slaves 12a–12n which results in a symmetric voltage swing about reference voltage Vref. Alternatively, a non-symmetric voltage swing may be accurately achieved by determining another register-setting.

For one embodiment, current calibrator 40 is included within master 11. For another embodiment, current calibrator 40 may reside outside of master 11. For another embodiment, current calibrator 40 comprises memory in master 11 which stores a sequence of instructions which when executed by master 11 results in the improved method for setting a current of the current mode drivers for bus 30.

For yet another embodiment, current calibrator 40 is a medium that stores a sequence of instructions which when executed results in an improved method for setting a current of the current mode driver for bus 30. For this embodiment, current calibrator 40 is readable by master 11 or another processing device coupled to master 11. Execution of the sequence of instructions could be within or outside master 11. Current calibrator 40 may comprise a floppy disk, hard drive, or other type of magnetic storage media, digital compact disk, optical disk, integrated circuit component with memory storage capabilities such as various types of RAMs or ROMs and their derivatives, or any other storage medium.

When the current mode drivers for bus 30 are in an "off" state, the respective bus line either stays at or rises to a high voltage level (VOH) approximately equal to Vterm. When a current mode driver is in an "on" state, the current mode driver provides a path to ground for current for the respective bus line, and a low voltage level (VOL) is generated on the bus line. For one embodiment, VOH is approximately equal to 2.5 volts and an operational VOL is approximately equal to 1.5 volts. The reference voltage Vref comprises the midpoint of VOH and the operational VOL, that is, 2.0 volts. For one embodiment, VOH represents a logical zero state and the operational VOL represents a logical one state.

Figure 2:
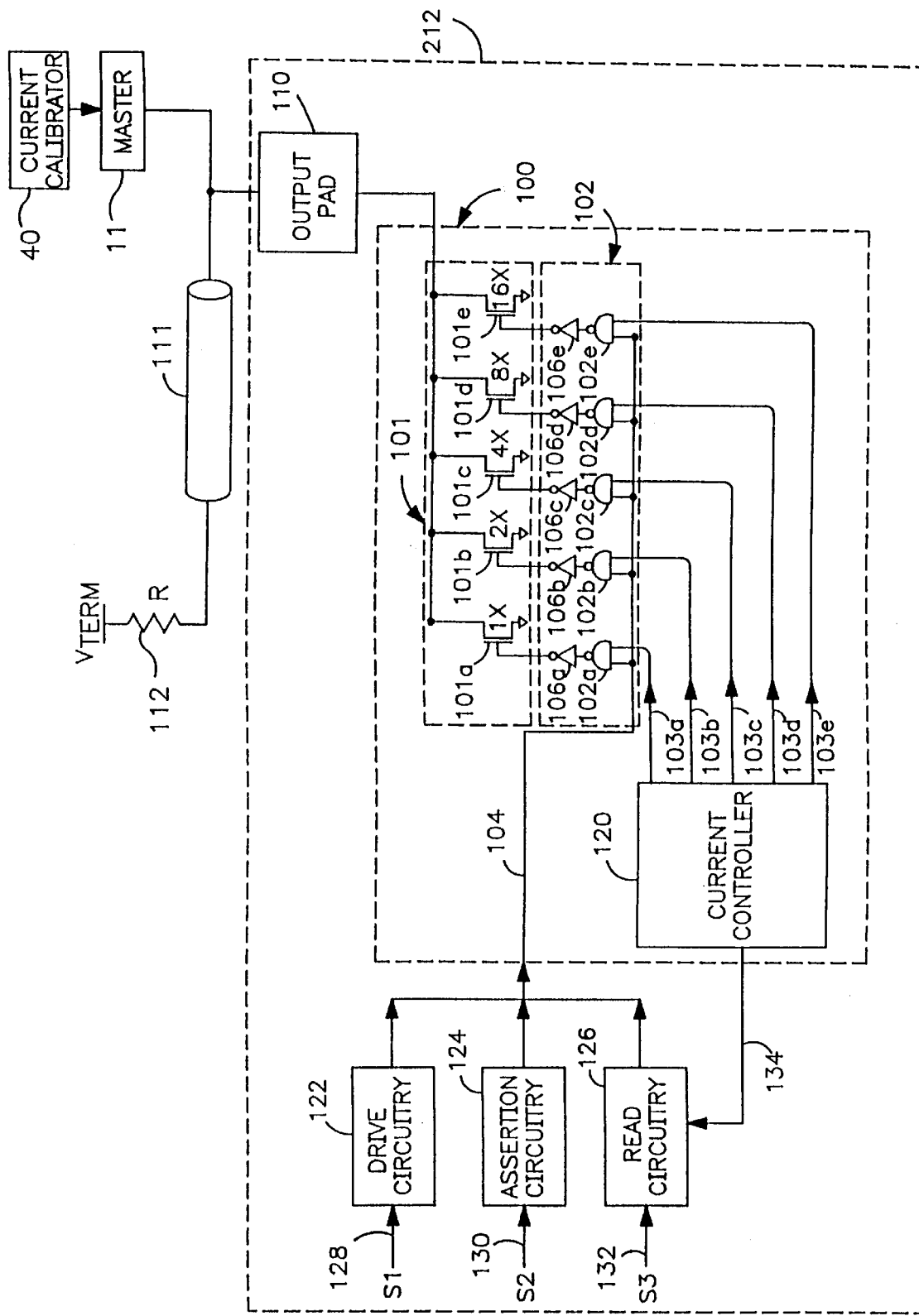
FIG. 2 is a block diagram of one embodiment of a current mode driver for a slave in a bus system, wherein the slave includes drive circuitry, assertion circuitry, read circuitry, a current controller, logic circuitry, and a transistor array.

FIG. 2 is a block diagram of one embodiment of a current mode driver 100 for an exemplary slave 212 in bus system 10 of FIG. 1. Current mode driver 100 may also be found in master 11.

In FIG. 2, current mode driver 100 is coupled to data transmission line 111 via output pad 110. Data transmission line 111 is one of the data transmission lines of bus 30 which is in turn coupled to master 11. Master 11 is coupled to current calibrator 40. Transmission line 111 is coupled to the termination voltage Vterm via termination resistor 112 which is one of resistors 20 illustrated in FIG. 1.

Current mode driver 100 controls an amount of current on data transmission line 111. Current mode driver 100 includes output transistor array 101 coupled to output logic circuitry 102. Output transistor array 101 comprises transistors 101a–101e coupled in parallel between ground and output pad 110. Transistor 101a has a unit width of 1X. Each of transistors 101b–101e have binary multiples of the unit width. Transistors 101a–101e provide an adjustable current source and a path to ground for current on data transmission line 111.

Output logic circuitry 102 includes NAND gates 102a–102e coupled to inverters 106a–106e. The outputs of inverters 106a–106e are coupled to the gates of transistors 101a–101e respectively. Each of NAND gates 102a–102e includes two inputs. One input is coupled to current controller 120 via one respective line of lines 103a–103e. The other input receives a drive level signal on line 104.

Current controller 120 uses a reference current and other logic to decide what combination of transistors 101a–101e will result in the desired current on transmission line 111 under existing operating conditions. Current controller 120 uses a five bit binary logic value on lines 103a–103e to control logic circuitry 102. The five bit value is ANDed with the drive level signal on line 104 to control the turning on of one or more of transistors 101a–101e which will result in the desired current on transmission line 111. Thus, logic circuitry 102 provides a control function with respect to the voltage level on transmission line 111.

For another embodiment, output transistor array 101 may comprise any number of transistors, wherein each transistor is coupled to a NAND gate and an inverter in output logic circuitry 102. Each NAND gate in turn receives a binary logic value from current controller 120. For one embodiment, current controller 120 outputs a six bit binary logic value to output logic circuitry 102, and output logic circuitry 102 couples six signals to six transistors in output transistor array 101.

For one embodiment, master 11 contains one current controller, and each of slave 12a–12n contains one current controller. Each current controller is coupled to eleven sets of output logic circuitry and eleven sets of output transistor arrays. For another embodiment, master 11 and each of slaves 12a–12n contains eleven current controllers each coupled to its own output logic circuitry and output transistor array.

The drive level signal on line 104 is provided by either drive circuitry 122, assertion circuitry 124, or read circuitry 126. Select signal S1 on line 128 enables drive circuitry 122 to provide the drive level signal on line 104. Select signal S2 on line 130 enables assertion circuitry 124 to provide the drive level signal on line 104. Select signal S3 on line 132 enables read circuitry 126 to provide the drive level signal on line 104. Select signals S1, S2, and S3 may be a part of a select bus. Select signals S1, S2, and S3 may be generated within slave 212 or external to slave 212 by master 11. For another embodiment, alternate select means may be provided to determine the source of the drive level signal on line 104.

Drive circuitry 122 is selected when slave 212 is selected for transmitting drive data on transmission line 111, and in which assertion circuitry 124 and read circuitry 126 are not selected. For one embodiment, slave 212 comprises a DRAM and the drive data comprises memory data read from a memory location or an output signal from the memory array in the DRAM. For another embodiment, current mode driver 100 resides in master 11 and drive circuitry 122 provides an output signal from master 11 as the drive level signal on line 104.

Assertion circuitry 124 is circuitry that enables master 11 to measure a plurality of samples of a voltage induced on transmission line 111 which have stabilized after a period of time. Assertion circuitry 124 is used by the improved process for setting a current of current mode driver 100 for transmission line 111 (and/or the other transmission lines of bus 30).

For one embodiment, assertion circuitry 124 provides the drive level signal on line 104 which comprises an output signal from a memory array of a DRAM. The output signal is used by slave 212 for current setting purposes. The output signal may be provided from one or more memory locations in the memory array which is accessed in a continuous or consecutive manner. For one embodiment, a plurality of consecutive bytes of assertion data are written into a plurality of consecutive memory locations. A read request from master 11 causes the bytes of assertion data to be provided in a continuous manner as the drive level signal on line 104.

Read circuitry 126 is the means for master 11 to read the output of current controller 120. Read circuitry 126 has a single bit output. Read circuitry 126 provides the drive level signal on line 104 which enables, for one embodiment, master 11 to read the five bit value on lines 103a–103e. One or all of the five bits 103a–103e is coupled to read circuitry 126 via bus 134. Read circuitry 126 may couple one of bits 103a–103e to line 104, or may sequentially couple a plurality of bits 103a–103e to line 104. Read circuitry 126 may be separately addressable by master 11 through the use of select signal S3 on line 132. Read circuitry 126 is used by the improved process for setting a current of current source driver 100 for transmission 111, as will be described in more detail below.

In a non-bypass mode of operating current controller 120, master 11 sends a register-setting to current controller 120. The register-setting may be loaded into a register within current controller 120. The register-setting causes current controller 120 to generate an output on lines 103a–103e which causes output logic circuitry 102 and transistor array 101 to generate a current and a voltage on transmission line 111. The output on lines 103a–103e may be different than the register-setting sent to current controller 120.

In a bypass mode of operating current controller 120, master 11 sends a register-setting to current controller 120. The register-setting may be loaded into a register in current controller 120. Current controller 120 outputs the register-setting on lines 103a–103e to output logic circuitry 102 and transistor array 101.

Figure 3:
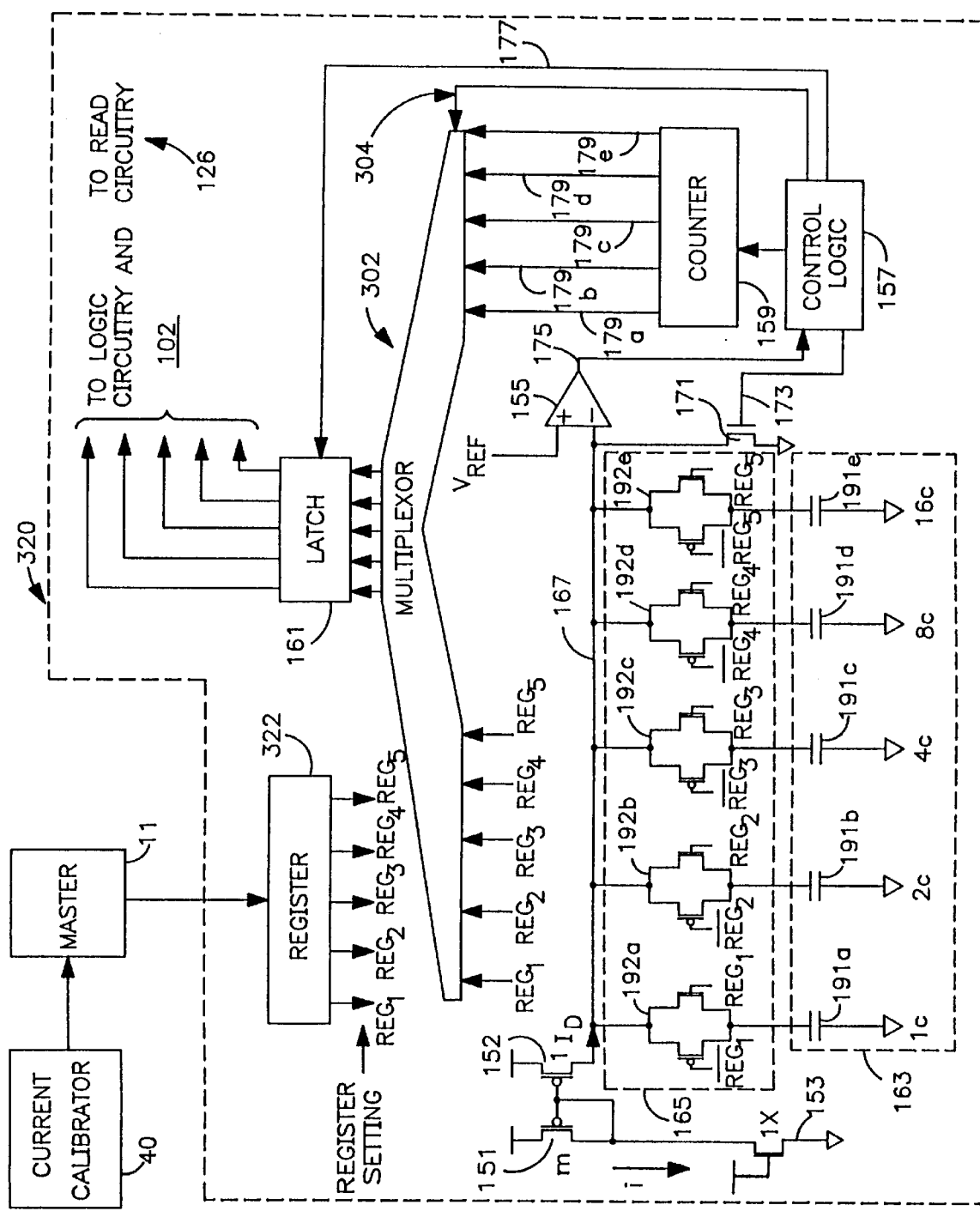
FIG. 3 is a circuit diagram of one embodiment of the current controller of FIG. 2.

FIG. 3 is a circuit diagram of one embodiment of capacitor reference current controller 320. Capacitance reference current controller 320 is one embodiment of current controller 120 of FIG. 2. Capacitor reference current controller 320 is especially suited for each of slaves 12a–12n. Capacitor reference current controller 320 uses on-chip capacitors, which minimizes the use of pins and off chip components. For an alternative embodiment, capacitor reference current controller 320 is part of a current mode driver that resides within master 11.

Capacitor reference current controller 320 includes capacitor array 163 to allow a user to set the value of the desired current on transmission line 111 of FIG. 2. Capacitor reference current controller 320 relies on the measurement of time that it takes to ramp capacitor array 163 from zero volts to Vref volts. When the capacitance of capacitor array 163 is proportional to the desired current on transmission line 111, then the time required to reach Vref will depend upon the desired current, temperature, and voltage.

Capacitor reference current controller 320 includes a current mirror formed by transistors 151, 152, and 153. The current mirror circuit acts as the charging source for capacitor array 163. The output of the current mirror circuit is coupled to capacitor array 163 and to one input of comparator 155 via line 167. The other input of comparator 155 is coupled to Vref.

Capacitor array 163 includes five capacitors 191a–191e. Capacitor 191a comprises a unit capacitance 1C. Each of capacitors 191a–191e comprise binary multiples of the unit capacitance, namely, 2C, 4C, 8C, and 16C, respectively. For another embodiment, capacitors 191b–191e may comprise other values relative to capacitor 191a. Each of capacitors 191a–191e is coupled to line 167 via one of transmission gates 192a–192e. Transmission gates 192a–192e form a capacitor selecting circuit 165. Each of transmission gates 192a–192e receives one of REG1–REG5 signals in complementary fashion. For example, transmission gate 192a receives REG1 signal and $\overline{REG1}$ signal. $\overline{REG1}$ signal is an inverted version of the REG1 signal. The REG signals are provided from a register 322 that receives a register-setting from master 11 and current calibrator 40. The on and off states of each of transmission gates 192a–192e depend on the REG signal applied, which in turn depends on the register-setting for register 322. Therefore, the capacitance connected to line 167 is selectable.

For another embodiment, capacitor array 163 may comprise any number of capacitors, wherein each capacitor is coupled to a transmission gate of capacitor selecting circuit 165. For one embodiment, capacitor array 163 comprises six capacitors.

Capacitor reference current controller 320 also includes discharge transistor 171 coupled between line 167 and ground. The on and off states of discharge transistor 171 are controlled by control logic 157.

Capacitor reference current controller 320 operates in the non-bypass mode as follows. A register-setting is loaded into register 322. The register-setting causes selected capacitors in capacitor array 163 to be coupled to line 167. Control logic 157 provides output signal 173 to discharge the capacitor array 163 through discharge transistor 171. Control logic 157 turns discharge transistor 171 off and simultaneously sets counter 159 to its zero state. Comparator 155 compares a voltage on line 167 with Vref and provides an output signal to control logic 157 on line 175. Control logic 157 receives the output signal of comparator 155 and causes counter 159 to begin counting. Counter 159 stops counting when the voltage on line 167 approximately equals Vref. Counter 159 outputs a five bit binary logic value to multiplexor 302 on lines 179a–179e. In response to a control signal on control line 304, multiplexor 302 couples the five bit binary logic values to latch 161. Latch 161 then applies the latched value to output logic circuitry 102 to turn on a particular combination of transistors 101a–101e of FIG. 2 in order to provide the desired current on transmission line 111. Control logic 157 is also coupled to latch 161 via line 177 to control the latching of the output of multiplexor 302.

In the bypass mode of operating capacitor reference current controller 320, multiplexor 302 also receives the REG signals from register 322. In response to the control signal on control line 304, multiplexor 302 couples he five REG signals REG1–REG5 to latch 161. Latch 161 then applies the latched value to logic circuitry 102 to turn on a particular combination of transistors 101a–101e of FIG. 2 to provide a current on transmission line 111. In addition, the latched value may be provided to read circuitry 126 to enable master 11 to read the register-setting associated with the current provided on transmission line 111. Multiplexor 302 and the control signal on line 304 may be collectively referred to as direct control circuitry because they provide a means for master 11 to perform a direct write to latch 161 and thereby directly set a current and voltage on transmission line 111.

Figure 4:
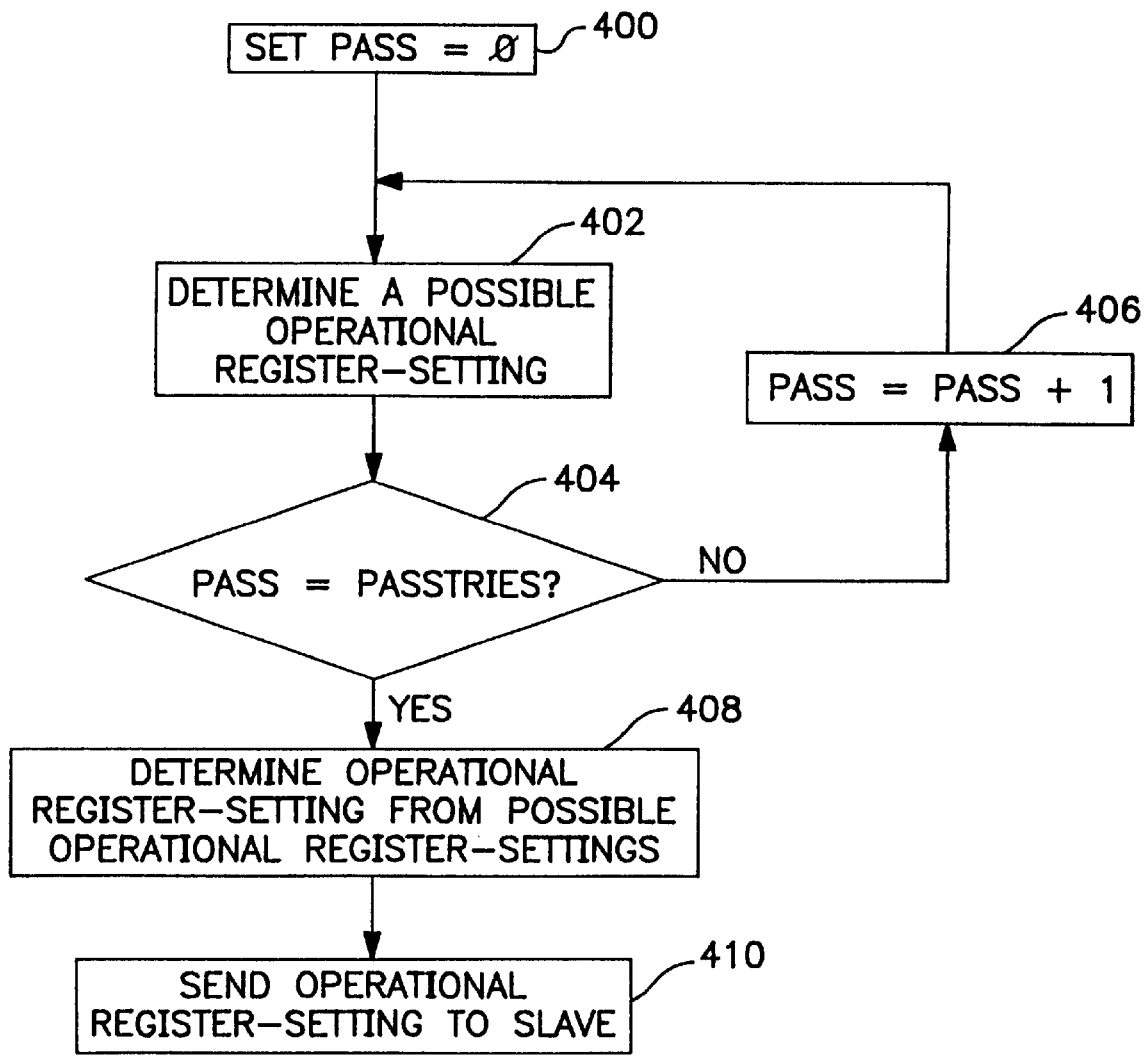
FIG. 4 is a flow chart of one embodiment for calibrating the current controller of FIG. 3.

FIG. 4 illustrates an improved process of calibrating a register-setting for current controller 120. For one embodiment, the improved process calibrates the register-setting for register 322 of capacitor reference current controller 320 illustrated in FIG. 3. The final calibrated register-setting is termed the operational register-setting. The operational register-setting is one which when loaded into current controller 120 sets a current and generates an operational VOL voltage on transmission line 111, such that, the difference between the operational VOL and Vref approximately equals the difference between Vterm (VOH) and Vref. The calibration is performed by current calibrator 40 or by master 11 using current calibrator 40.

For one embodiment, current calibrator 40 instructs master 11 to perform the method steps illustrated in FIG. 4. Master 11 begins the calibration process at step 400 by initializing the PASS variable to zero. The PASS variable records the number of times step 402 is performed. At step 402, master 11 determines a good value for a possible operational register-setting for current controller 120. A good value is one which will result in current mode driver 100 generating approximately a symmetrical voltage swing about Vref on transmission line 111. For another embodiment, a good value is one that will result in current mode driver 10 generating a desired relationship between the operational VOL, Vterm (VOH), and Vref.

Master 11 interacts with exemplary slave 212 of FIG. 2 in order to determine the possible operational register-setting (explained in detail in FIGS. 5 through 11 below). For one embodiment, the possible operational register-setting is stored in master 11. For an alternative embodiment, the possible operational register-setting is stored in current calibrator 40 or another signal processor coupled to current calibrator 40 and/or master 11.

At step 404, master 11 determines if PASS equals PASSTRIES. PASSTRIES is a predetermined number that indicates the number of possible operational register-settings that should be determined. For one embodiment, PASSTRIES equals four. If the predetermined number of possible operational register-settings has not been obtained (PASS does not equal PASSTRIES), then master 11 increments PASS by one at step 406 and repeats step 402. Steps 402 and 406 will be repeated until PASS equals PASSTRIES. Each time that master 11 executes step 402 another possible operational register-setting is determined. For one embodiment, the plurality of possible operational register-settings are stored in master 11, current calibrator 40, or another signal processor. For an alternative embodiment, the possible operational register-settings are accumulated and the result stored in master 11, current calibrator 40, or another signal processor.

Multiple possible operational register-settings are determined in order to mitigate the effect of transient conditions that may exist at slaves 12a–12n and master 11, such as device power supply variations, temperature variations, and other conditions that may cause operational register-settings to vary over time.

When the predetermined number of possible operational register-settings have been collected, master 11 determines an operational register-setting at step 408. For one embodiment, the operational register-setting comprises a measure of central tendency of the possible operational register-settings. For example, the operational register-setting may comprise the median, mode, or mean of the plurality of possible operational register-settings. The mean may comprise the sample mean, geometric mean, harmonic mean, or other types of mean calculations of the plurality of possible operational register-settings. Many other ways of determining the operational register-setting from the plurality of possible operational register-settings exist, including various statistical techniques such as choosing the first possible operational register-setting that occurs twice in succession.

After the operational register-setting is determined, master 11 sends the operational register-setting to slave 212 at step 410. As described above, when slave 212 is selected to drive the operational VOL on transmission line 111, the current mode driver 100 is activated such that the operational register-setting results in setting a current of the current mode driver 100, which generates the operational VOL on transmission line 111.

Two methods for determining a possible operational register-setting are described in more detail below. The first method described below generally in FIG. 5, uses the bypass mode. For one embodiment, the first method uses the direct write capability or bypass mode provided by the direct control circuitry illustrated in FIG. 3 as described above. The second method described below generally in FIG. 10, does not use the bypass mode.

Figure 5:
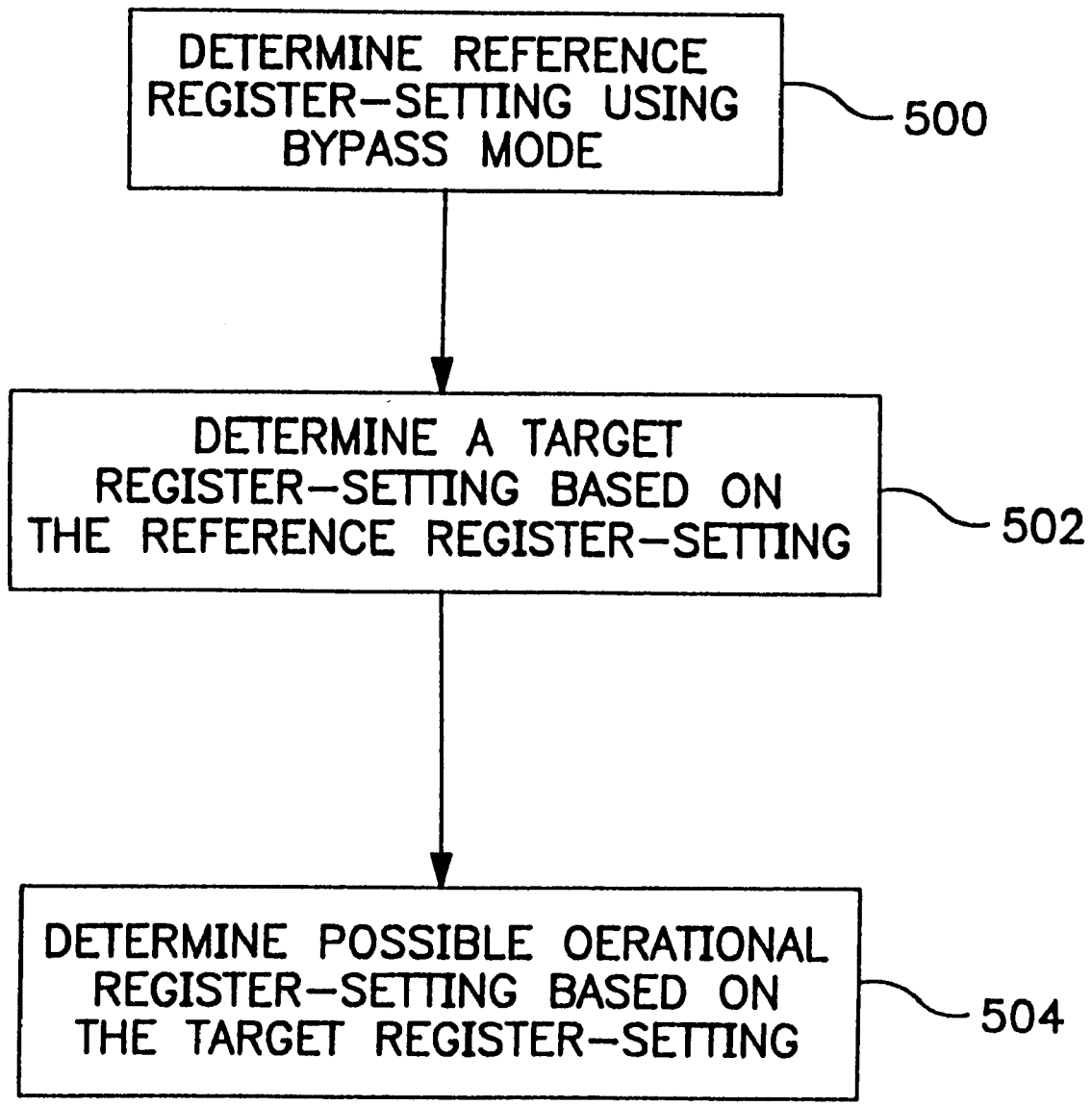
FIG. 5 is a flow chart of one embodiment for determining a possible operational register-setting for step 402 of FIG. 3.

FIG. 5 illustrates one embodiment of the first method for determining a possible operational register-setting for step 402 of FIG. 4. The embodiment illustrated in FIG. 5 uses the bypass mode of operating current controller 120. The method illustrated in FIG. 5 may stand on its own, that is, the possible operational register-setting generated by the method of FIG. 5 may be used as the operational register-setting for current controller 120.

The first method illustrated in FIG. 5 comprises a first phase of operation and a second phase of operation. The first phase of operation comprises steps 500 and 502. The second phase of operation comprises step 504.

At step 500, master 11 determines a reference register-setting for current controller 120 using the bypass mode. A reference register-setting comprises a register-setting that causes output driver 100 to set a current and generate a voltage on transmission line 111 that approximately equals Vref. For one embodiment, the reference register-setting is loaded into register 322 of capacitor reference current controller 320 and the bypass mode is used to set a current and generate a voltage approximately equal to Vref on transmission line 111. Embodiments for determining the reference register-setting for slave 212 are described in FIGS. 6, 7, and 11 below.

At step 502, a target register-setting is determined based on the reference register-setting. When the target register-setting is supplied to current controller 120, current controller 120 uses the bypass mode to output the target register-setting on lines 103a–103e and cause output logic circuitry 102 and output transistor array 101 to set a current and generate a voltage approximately equal to the operational VOL on transmission line 111.

For one embodiment the target register-setting is determined by multiplying the reference register-setting by the multiplier SWINGMULTIPLIER. The value of SWING-MULTIPLIER is a predetermined number. The value of the target register-setting is not simply double the value of the reference register-setting because additional current is required to produce a voltage difference between Vref and VOL which approximately equals the voltage difference between Vterm (VOH) and Vref. The increased current is required in order to compensate for non-ideal current source characteristics of transistors 101a–101e of output transistor array 101.

For another embodiment, the operational VOL and Vterm (VOH) may not be symmetrically positioned about VREF. For this embodiment, the value of SWINGMULTIPLIER may comprise a value which achieves the desired relationship between Vterm (VOH), the operational VOL, and VREF.

Figure 12:
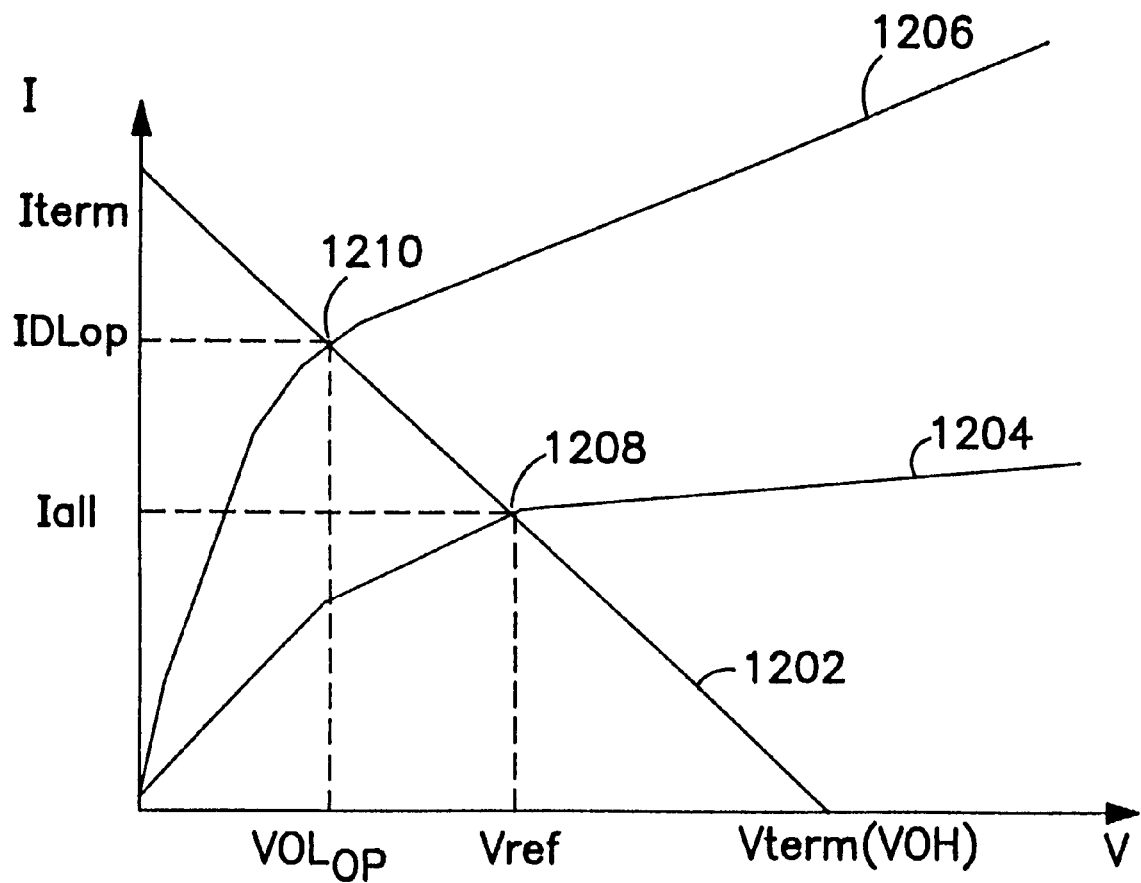
FIG. 12 is a graph of a plurality of transitor curves for the transistor array of FIG. 2.

SWINGMULTIPLIER may be predetermined with knowledge of the non-ideal current source characteristics of output transistor array 101. FIG. 12 illustrates a plurality of transistor curves for transistor array 101, where I is the current of transistor array 101 and V is the voltage generated on bus 30. Load line 1202 is the operating load line for transistor array 101 and may be expressed as I=((Vterm-V)/Rterm), where Rterm is one of the terminating resistors 20 illustrated in FIG. 1. Load line 1202 has a maximum current Iterm, and a maximum voltage Vterm (VOH). Transistor curve 1204 corresponds to the condition where a particular number of transistors in transistor array 101 are turned on in order to approximately generate Vref and Iall on bus 30 at operating point 1208. Transistor curve 1206 corresponds to the condition where another particular number of transistors in transistor array 101 are turned on in order to approximately generate the operational voltage VOL (VOLop) and IOLop on bus 30 at operating point 1210.

The transistor characteristics are commonly described by linearized parameters. One such parameter is rds, which is defined as the linearized drain-source resistance of a FET transistor. More precisely, rds is the slope of a graph of voltage versus current for a transistor at its operating point. The operating point for defining rds can be chosen as Vref, with the understanding that rds so defined gives the linearized behavior of the transistor array 101 for voltages near Vref.

The linearized parameters are defined when the 1X transistor 101a of transistor array 101 is turned on. Under this condition, if V(I) is the graph of the output current versus voltage of the transistor 101a, and if Vref is the operating point about which rds is defined (operating point 1208), then rds=dV/dI, where the derivative is evaluated at an output voltage equal to Vref. The linearized output characteristic is approximated as $V=Vref+(I-Iall)*rds$, where Iall is the current through the transistor which yields an output voltage equal to the operating point voltage: Vref=V(Iall).

For one embodiment, each transistor of the transistor array 101 will have substantially the same output characteristic as the other transistors, except that the current of each transistor will be proportional to its width.

The value of SWINGMULTIPLIER may be derived generally as follows. The current I induced by transistor array 101 on bus 30 will change or be scaled by the number of transistors turned on in transistor array 101. If n is the number of transistors turned on in transistor array 101, then for a particular register-setting that causes n transistors to be turned on, I may be expressed as: $I=n*(((V-Vref)/rds)+Iall)$. Using the load line equation and solving for n, $n=(Vterm-V)/(Rterm*(((V-Vref)/rds)+Iall))$. The value of SWING-MULTIPLIER is defined as the register-setting (the operational register-setting) that causes a number of transistors to be turned on in transistor array 101 so that VOLop is generated on bus 30, divided by the register-setting (the reference register-setting) that causes another number of transistors to be turned on in transistor array 101 so that Vref is generated on bus 30. In other words, SWINGMULTIPLIER=$n_{op}/n_{ref}$, where $n_{op}$ is the number of transistors turned on in transistor array 101 so that VOLop is generated on bus 30, and $n_{ref}$ is the number of transistors turned on in transistor array 101 so that Vref is generated on bus 30. Substituting the general equation for n into $n_{op}$ and $n_{ref}$ yields an equation for SWINGMULTIPLIER equal to $((Vterm-VOLop)*Iall)/((Vterm-Vref)*(((VOLop-Vref)/rds)+Iall))$. This equation may be rewritten as: SWINGMULTIPLIER=$(Vterm-VOLop)/((Vterm-Vref)*(1-(Vref-VOLop)/(Iall*rds)))$.

When the value of SWINGMULTIPLIER is $(Vterm-VOLop)/((Vterm-Vref)*(1-(Vref-VOLop)/(Iall*rds)))$, then the target register-setting will generate an output voltage level approximately equal to VOLop. When a value of SWINGMULTIPLIER is $2/(1-(Vterm-Vref/(rds*Iall)))$, then VOLop and Vterm (VOH) will be positioned approximately symmetrically about Vref.

For one embodiment, rds*Iall of the transistor array 101 is approximately 5.5 volts, (Vterm-Vref) is approximately 0.5 volts, and SWINGMULTIPLIER is approximately 2.2. For another embodiment, rds*Iall of the transistor array 101 is approximately 7 volts, (Vterm-Vref) is approximately 0.5 volts, and SWINGMULTIPLIER is approximately 2.15.

At step 504, the second phase of operation determines the possible operational register-setting for current controller 120 based on the target register-setting determined in step 502. Given that in the bypass mode the target register-setting is supplied directly by current controller 120 to lines 103a–103e, the possible operational register-setting must be determined using the non-bypass mode which causes current controller 120 to approximately generate the target register-setting on lines 103a–103e. Exemplary embodiments for determining the possible operational register-setting based on the target register-setting for use in non-bypass mode are described in FIGS. 8 and 9 below. For another embodiment, the target register-setting is used as the possible operational register-setting for use in bypass mode.

For the embodiment of capacitor reference current controller 320 illustrated in FIG. 3, the possible operational register-setting corresponds to a register-setting that when loaded into register 322 and applied to capacitor array 163, causes counter 159 to count to approximately the target register-setting. For another embodiment, the target register-setting is used directly as the possible operational register-setting without using capacitor array 163.

Figure 6:
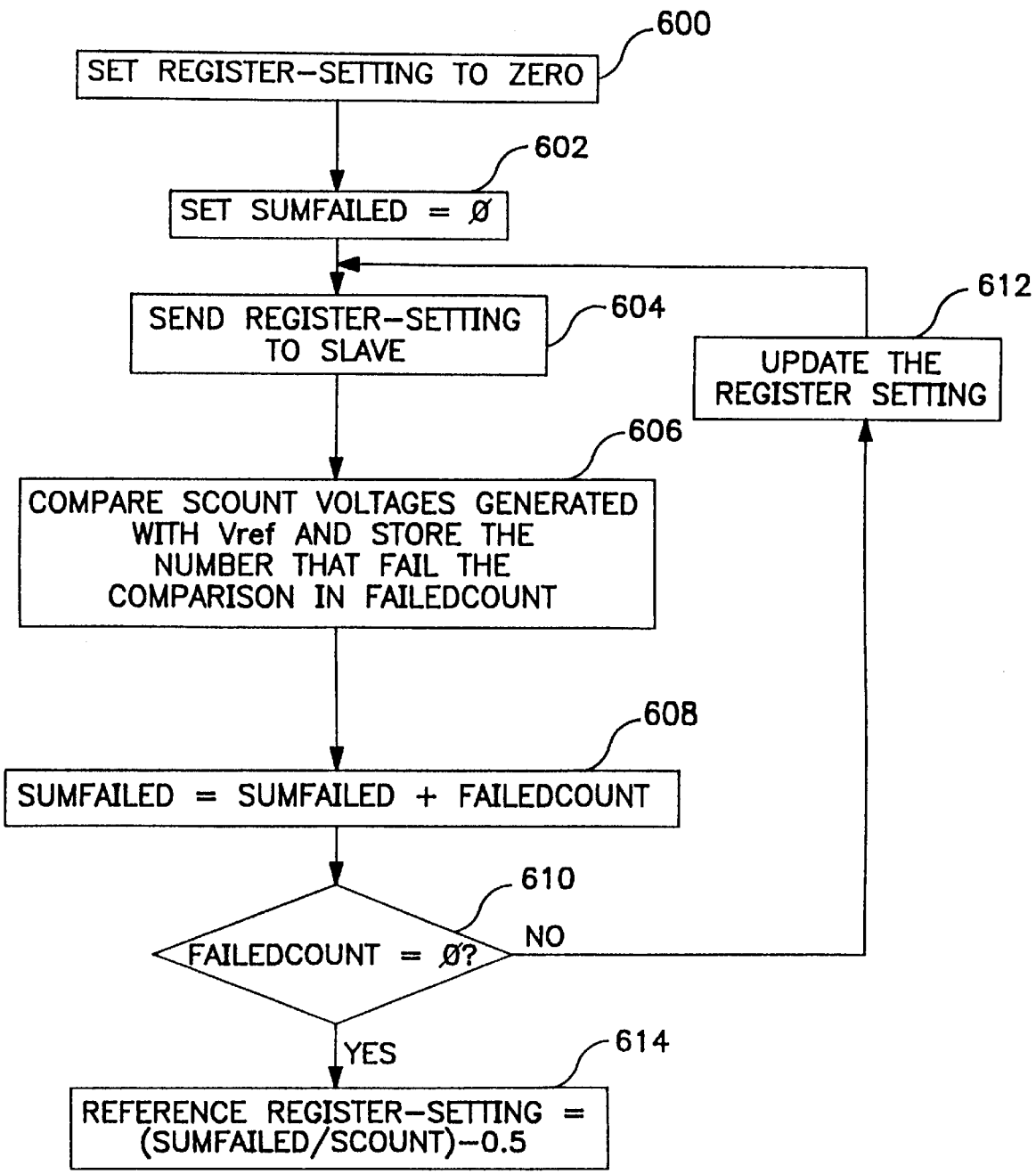
FIG. 6 is a flow chart of one embodiment for determining a reference register-setting for step 500 of FIG. 5, and step 1000 of FIG. 10.

One embodiment for determining the reference register-setting for step 500 of FIG. 5 is illustrated in FIG. 6. Master 11 begins the process of determining a reference register-setting by initializing a register-setting to zero at step 600. At step 602, master 11 initializes SUMFAILED to zero. SUMFAILED records a number of samples which fail a comparison with Vref. At step 604, master 11 sends the register-setting to slave 212. Using the bypass mode, current controller 120 outputs the register-setting to output logic circuitry 102.

At step 606, output logic circuitry 102 and output transistor array 101 set a current and generate a voltage on transmission line 111 when assertion circuitry 124 is selected. For one embodiment, this step is performed for each of the transmissions lines of bus 30. For another embodiment, this step is performed for eight of the BusData [8:0] transmission lines 32. Master 11 then samples or compares the voltages generated on each of the transmission lines a plurality of times against Vref. The transmission lines are collectively sampled SCOUNT times. SCOUNT is a predetermined number. For one embodiment, eight of BusData[8:0] transmission lines 32 are sampled by master 11, and SCOUNT is eighty (80).

The transmission lines of bus 30 are sampled a number of times to mitigate variations between output drivers in slave 212, variations in the comparison circuits in master 11, variations in the reference and circuit voltages in master 11 and slave 212, and variations in bus termination of each of the transmission lines of bus 30.

Master 11 counts the number of comparisons which failed the comparison with Vref and stores the count in indicator FAILEDCOUNT. For one embodiment, a failed comparison indicates that a voltage generated on one of the transmission lines of bus 30 is greater than Vref. For another embodiment, a failed comparison indicates that a voltage generated on one of the transmission lines of bus 30 is less than Vref.

At step 608, master 11 updates SUMFAILED with FAILEDCOUNT. At step 610, if FAILEDCOUNT does not equal zero, then the register-setting is updated by one and steps 604 through 610 are repeated. Steps 604 through 612 will be repeated until the register-setting is updated to a value that causes FAILEDCOUNT to equal zero.

When FAILEDCOUNT equals zero, the SCOUNT voltage samples all pass a comparison with Vref. The reference register-setting is then determined at step 614. The reference register-setting is an approximation of the register-setting that corresponds to the transition, from fail to pass, resulting from the comparison against Vref of the SCOUNT sampled voltages generated on bus 30. A transition zone for determining the reference register-setting is bounded on one end by a first register-setting that results in no SCOUNT sampled voltages passing a comparison with Vref, and on another end by a second register-setting that results in all SCOUNT samples voltages passing a comparison with Vref. For one embodiment, the reference register-setting comprises either the first or the second register-setting bounding the transition zone.

For another embodiment, the reference register-setting is a register-setting that corresponds to a measure of central tendency of the transition, from fail to pass, resulting from the comparison against Vref of the SCOUNT sampled voltages generated on bus 30. For example, the measure of central tendency may comprise the median, mode, or mean of the transition, from fail to pass, of the SCOUNT sampled voltages generated on bus 30. The mean may comprise the sample mean, geometric mean, harmonic mean, or other types of mean calculations. Many other ways may exist for determining the measure of central tendency of the transition, from fail to pass, resulting from the comparison against Vref of the SCOUNT sampled voltages generated on bus 30. For the embodiment illustrated at step 614, SUMFAILED is divided by SCOUNT and a bias number of 0.5 is subtracted from the result.

For an alternative embodiment, FAILEDCOUNT is compared against a number other than zero at step 610. For yet another embodiment, the register-setting is updated only a predetermined number of times before the reference register-setting is determined at step 614. For yet another embodiment, the reference register-setting is determined when the register-setting reaches a maximum number that can be stored in register 322.

For one example of the operation of FIG. 6, an initialized register-setting equal to zero is sent to slave 212 at step 604. The initialized register-setting causes none of transistors 101a–101e to be turned on in output transistor array 101. Thus, transmission line 111 and the other transmission lines of slave 212 will remain at Vterm. At step 606, master 11 compares Vterm against Vref SCOUNT times and stores the number of failures in FAILEDCOUNT. For this embodiment, Vterm equals VOH and a failed comparison indicates that a voltage generated on one of the transmission lines of bus 30 is greater than Vref. Therefore, the first time through the process of FIG. 6, FAILEDCOUNT equals SCOUNT. Given that FAILEDCOUNT is greater than zero, step 612 updates the register-setting. Steps 604 through 612 are repeated until the register-setting is updated to a value that generates voltages on bus 30 that are each less than Vref. The reference register-setting is then determined by dividing SUMFAILED by SCOUNT and subtracting the bias number from the result.

For another example of the operation of FIG. 6, master 11 stores the number of voltages that are less than Vref in FAILEDCOUNT at step 606. Steps 604 through 612 are repeated until the register-setting is updated to a value that generates voltages on bus 30 that are each greater than Vref. The reference register-setting is then determined by dividing SUMFAILED by SCOUNT and subtracting the bias number from the result.

Figure 7:
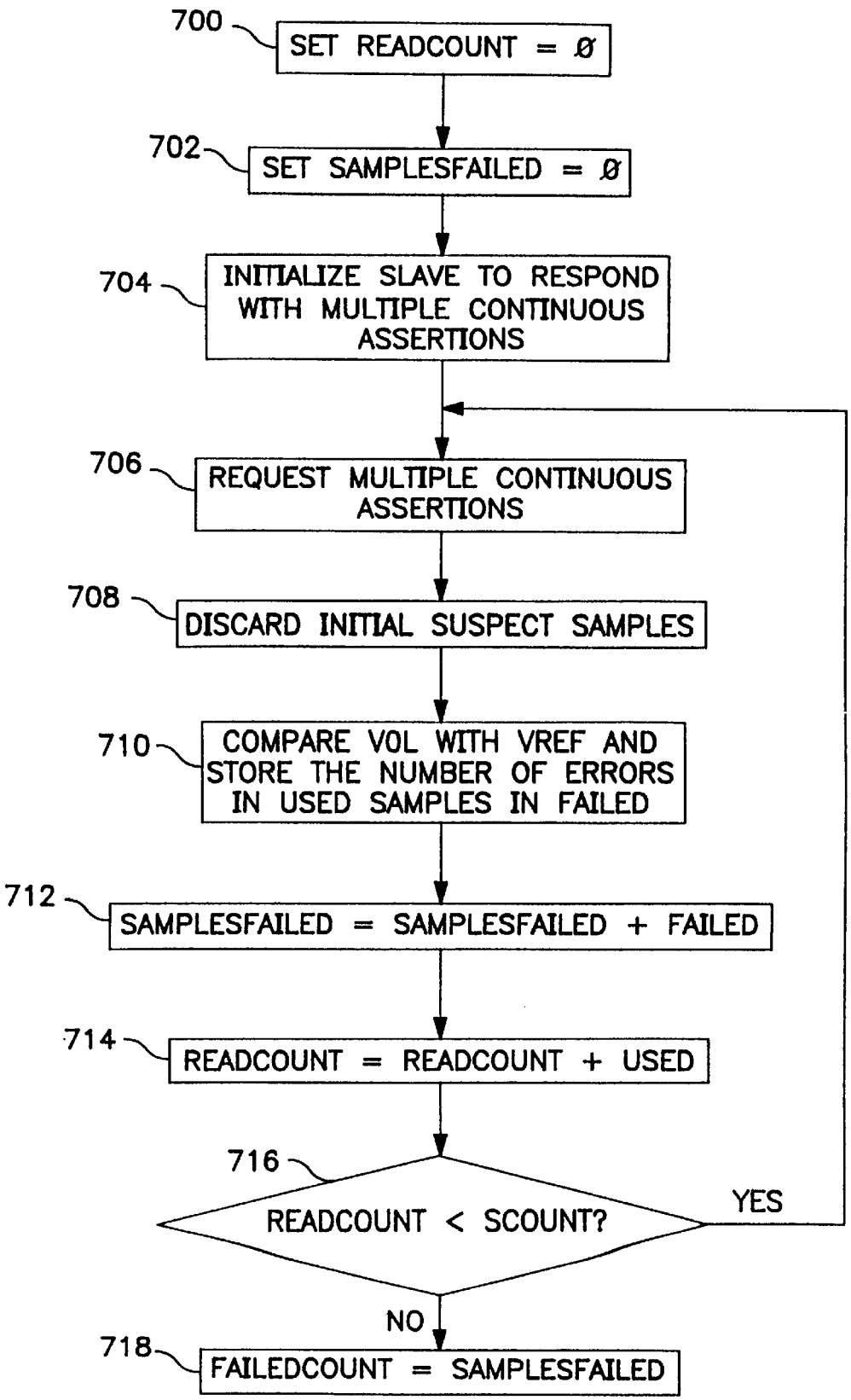
FIG. 7 is a flow chart of one embodiment for determining a number of sampled voltages which fail a comparison with a reference voltage.

FIG. 7 illustrates one embodiment for implementing step 606 of FIG. 6. At step 700, READCOUNT is initialized to zero. READCOUNT records the number of voltages generated on the transmission lines of slave 212 which have been sampled or compared against Vref by master 11. At step 702, SAMPLESFAILED is initialized to zero. SAMPLESFAILED records the number of samples that have failed the comparison with Vref.

At step 704, master 11 initializes assertion circuitry 124 to respond, when selected, with multiple continuous assertions of the drive level signal on line 104. For one embodiment, assertion circuitry 124 comprises a plurality of memory locations in slave 212, and assertion circuitry 124 is initialized by writing multiple bytes of assertion data into the plurality of memory locations.

At step 706, master 11 requests assertion circuitry 126 to provide the drive level signal on line 104. For one embodiment, master 11 sends a read request to slave 212 which causes the multiple bytes of assertion data to be read in a consecutive and continuous manner. The continuous assertions are supplied as the drive level signal on line 104 and enable output logic circuitry 102 and output transistor array 101 to supply a current and generate a voltage on transmission line 111 (and/or the other transmission lines of bus 30) for an extended period of time.

Generating a voltage on transmission line 111 for an extended period of time enables master 11 to take multiple samples, or make multiple comparisons with Vref. This mitigates the effect of any small reflections caused by discontinuities on bus 30, small changes in transistor drive characteristics of transistors 101a–101e due to changing voltages, and other like disturbances. For one embodiment, the assertion circuitry drives the drive level signal for a period of time which enables master 11 to compare eight sample voltages per transmission line of bus 30 against Vref.

At step 708, master 11 ignores a first number of samples. The first number of samples in time are those which are suspect samples and which are most prone to the disturbances described above. For one embodiment, master 11 samples each transmission line of bus 30 eight times, but ignores the first six samples of each of the transmission lines of bus 30 driven by slave 212. For another embodiment, master 11 waits a period of time for the transmission lines to become stable before sampling each transmission line of bus 30 driven by slave 212.

At step 710, master 11 samples or compares the voltages generated on the transmission lines by slave 212 with Vref. USED samples are taken. USED is a predetermined number. For one embodiment, USED equals eight, such that one sample or comparison with Vref is made by master 11 for each of eight transmission lines of bus 30. Master 11 counts the number of comparisons which failed, and stores the count in FAILED. For one embodiment, a failed comparison indicates that a voltage generated on one of the transmission lines of bus 30 is greater than Vref. For another embodiment, a failed comparison indicates that a voltage generated on one of the transmission line of bus 30 is less than Vref.

At step 712, master 11 updates SAMPLESFAILED with FAILED. At step 714, master 11 updates READCOUNT with USED. At step 716, READCOUNT is compared with SCOUNT. If READCOUNT is less than SCOUNT then steps 706 through 716 are repeated. For one example, SCOUNT equals eighty (80) and USED equals eight (8) such that steps 706 through 714 will be repeated ten times. That is, each transmission line of bus 30 will be sampled or compared by master 11 a total of ten times for every register-setting sent by master 11 to slave 212. This results in a total of eighty samples or comparisons of the voltages generated on bus 30 by slave 212 as a result of master 11 sending each register-setting to slave 212. When SCOUNT samples or comparisons have been made, the total number of the SCOUNT samples which failed the comparison made by master 11 is stored in indicator FAILEDCOUNT and provided for use in the process of FIG. 6.

Figure 11:
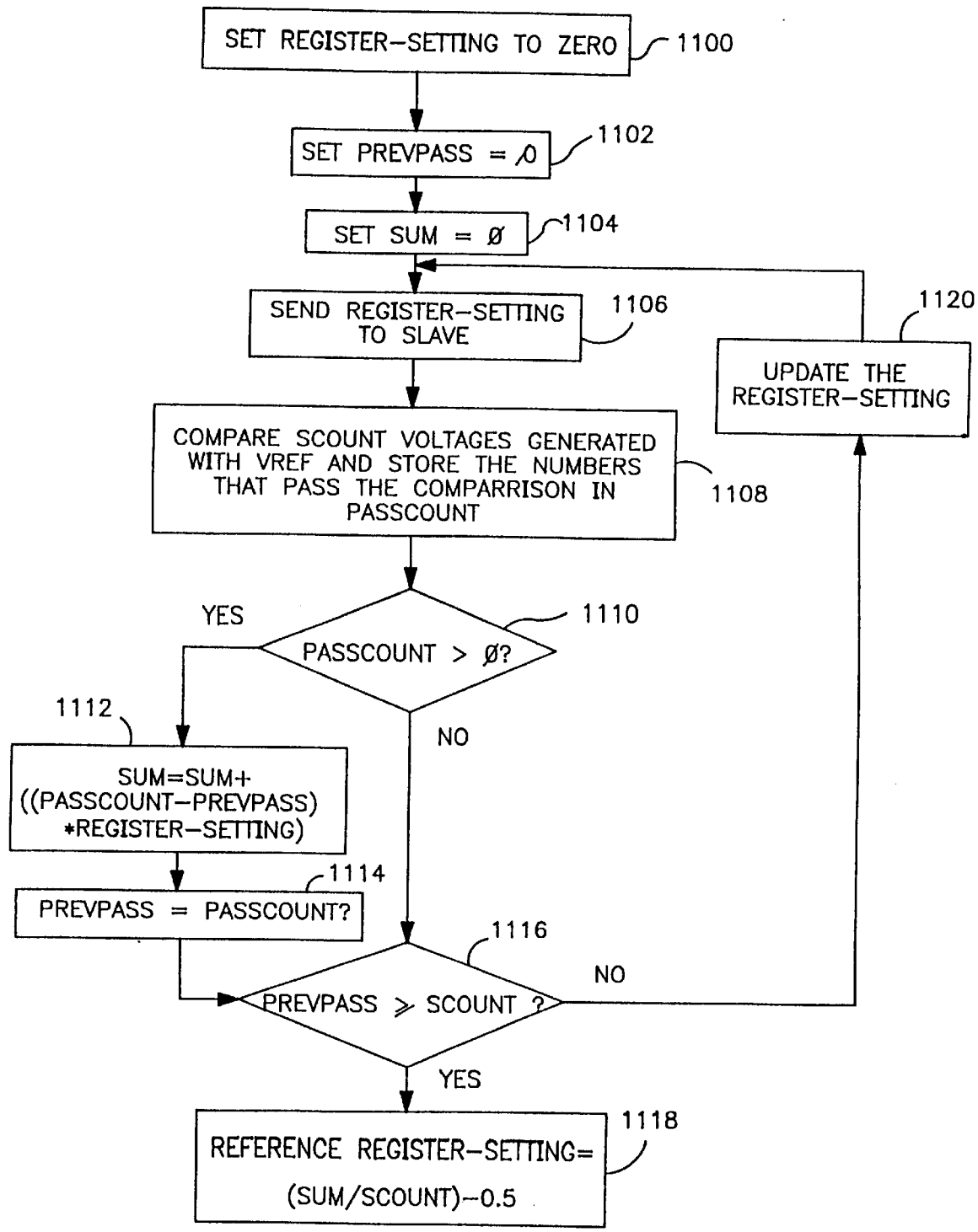
FIG. 11 is a flow chart of another embodiment for determining a reference register-setting for step 500 of FIG. 5, and step 1000 of FIG. 10.

Another embodiment for determining a reference register-setting for step 500 of FIG. 5 is illustrated in the flow chart of FIG. 11. In contrast to the process illustrated in FIG. 6, FIG. 11 monitors the number of SCOUNT voltages that pass a comparison with Vref. As in FIG. 6, the process of FIG. 11 also yields a reference register-setting that is an approximation of the register-setting that corresponds to the transition, from fail to pass, resulting from the comparison against Vref of the SCOUNT sampled voltages generated on bus 30.

The process starts at step 1100 by initializing a register-setting to zero. At step 1102, master 11 initializes PREVPASS to zero. PREVPASS records the number of samples that pass a comparison with Vref. At step 1104, master 11 initializes SUM to zero. At step 1106, master 11 sends the register-setting to slave 212. Using the bypass mode, current controller 120 outputs the register-setting to output logic circuitry 102.

At step 1108, output logic circuitry 102 and output transistor array 101 set a current and generate a voltage on transmission line 111 when assertion circuitry 124 is selected. For one embodiment, this step is performed for each of the transmissions lines of bus 30. For another embodiment, this step is performed for eight of the BusData [8:0] transmission lines 32. Master 11 then samples or compares the voltages generated on each of the transmission lines SCOUNT times. For one embodiment, eight of BusData[8:0] transmission lines 32 are sampled by master 11, and SCOUNT is eighty (80).

Master 11 counts the number of comparisons that pass the comparison with Vref and stores the count in indicator PASSCOUNT. PASSCOUNT is equivalent to SCOUNT minus FAILEDCOUNT (described with respect to FIG. 6). For one embodiment, a passed comparison indicates that a voltage generated on one of the transmission lines of bus 30 is greater than Vref. For another embodiment, a failed comparison indicates that a voltage generated on one of the transmission lines of bus 30 is less than Vref.

At step 1110, master 11 determines whether PASSCOUNT is greater than zero. If PASSCOUNT is greater than zero, master 11 updates SUM to equal SUM plus ((PASSCOUNT–PREVPASS) * register-setting). PREVPASS is then set to PASSCOUNT at step 1114.

If PASSCOUNT was less than or equal to zero at step 1110, or after step 1114, master 11 determines whether PREVPASS is greater than or equal to SCOUNT at step 1116. If PREVPASS is not greater than or equal to SCOUNT at step 1116, the register-setting is updated by one and the process returns to step 1106. Steps 1106–1116 and step 1120 will be repeated until the register-setting is updated to a value that causes PREVPASS to be greater than or equal to SCOUNT.

When PREVPASS equals SCOUNT at step 1116, the SCOUNT voltage samples all pass a comparison with Vref. The reference register-setting is then determined at step 1118. As described previously, the reference register-setting is a register-setting that is an approximation of the register-setting that corresponds to the transition, from fail to pass, resulting from the comparison against Vref of the SCOUNT sampled voltages generated on bus 30. For the embodiment illustrated at step 1118, SUM is divided by SCOUNT, and a bias number of 0.5 is subtracted from the result.

For an alternative embodiment, PREVPASS is compared against a number other than SCOUNT at step 1116. For yet another embodiment, the register-setting is updated only a predetermined number of times before the reference register-setting is determined at step 1118. For yet another embodiment, the reference register-setting is determined when the register-setting reaches a maximum number that can be stored in register 322.

For one example of the operation of FIG. 11, an initialized register-setting equal to zero is sent to slave 212 at step 1106. The initialized register-setting causes none of transistors 101a–101e to be turned on in output transistor array 101. Thus, transmission line 111 and the other transmission lines of slave 212 will remain at Vterm. At step 1108, master 11 compares Vterm against Vref SCOUNT times and stores the number of passes in PASSCOUNT. For this embodiment, Vterm equals VOH and a passing comparison indicates that a voltage generated on one of the transmission lines of bus 30 is less than Vref. Therefore, the first time through the process of FIG. 11, PASSCOUNT equals zero. When PASSCOUNT is zero, the process transitions to step 1116. At step 1116, PREVPASS is less than SCOUNT and step 1120 updates the register-setting and steps 1106 through 1116 and step 1120 are repeated until PASSCOUNT is greater than zero.

When PASSCOUNT is greater than zero, the process transitions to step 1112. At step 1112, SUM is updated. At step 1114, PREVPASS is updated to PASSCOUNT. At step 1116, PREVPASS is compared against SCOUNT. Steps 1106–1116 and step 1120 are repeated until the register-setting is updated to a value that generates voltages on bus 30 that are each less than Vref causing PASSCOUNT to be equal to SCOUNT, and subsequently, PREVPASS to be equal to than SCOUNT at step 1116. The reference register-setting is then determined by dividing SUM by SCOUNT and subtracting the bias number from the result.

It will be appreciated by one generally skilled in the art that the method of FIG. 7 may be altered to perform step 1108 of FIG. 11. It will also be appreciated that, for one embodiment, the methods of FIGS. 6 and 7 yield an equivalent result for a reference register-setting as the method of FIG. 11.

One embodiment for determining a target register-setting for step 502 of FIG. 5 has been previously described. For this embodiment, the target register-setting is determined by multiplying the reference register-setting (determined in step 500) by the variable SWINGMULTIPLIER.

Figure 8:
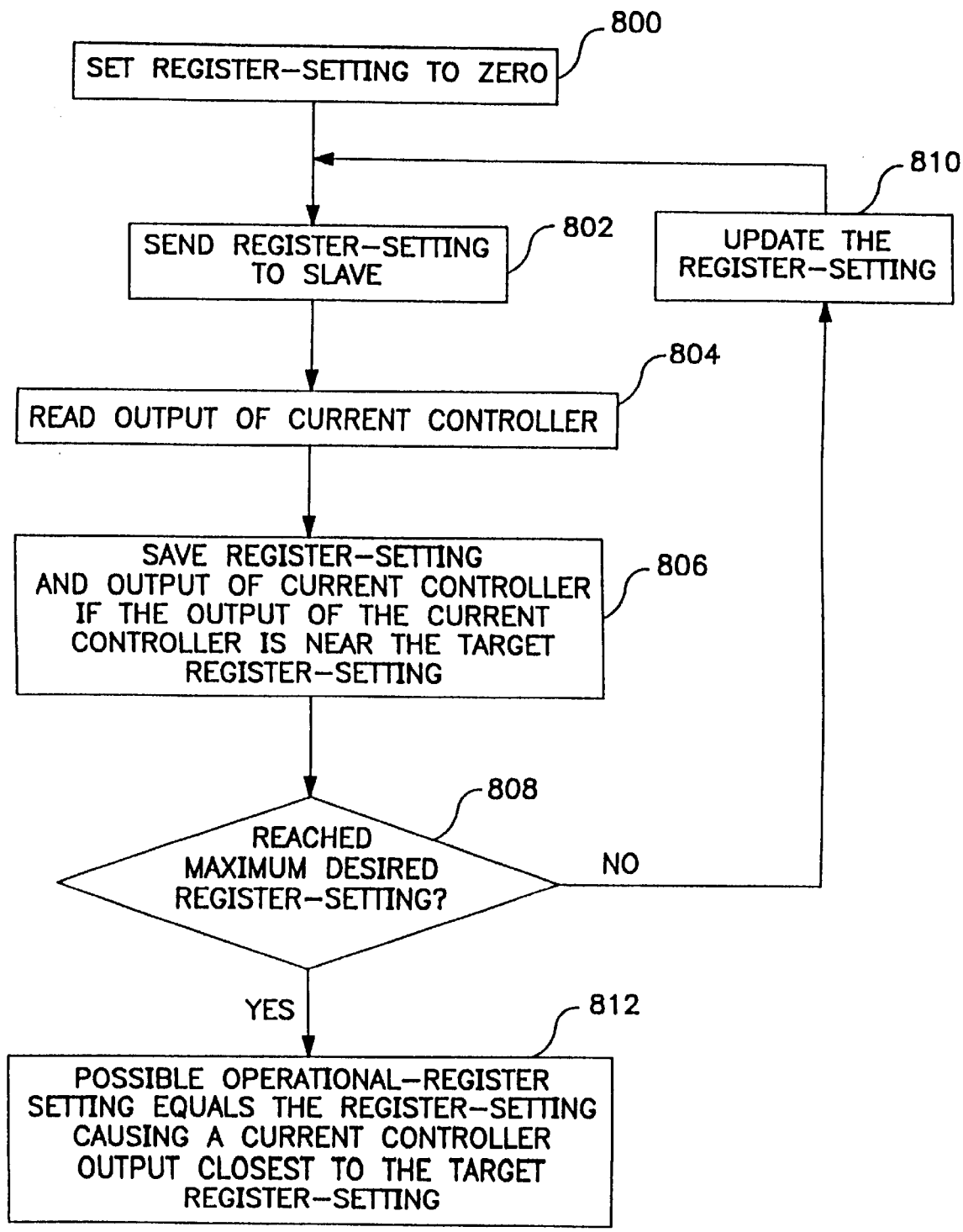
FIG. 8 is a flow chart of one embodiment for determining an operational register-setting.

FIG. 8 illustrates one embodiment for determining a possible operational register-setting for step 504 of FIG. 5. As described above, step 504 comprises the second phase for determining a possible operational register-setting based on a target register-setting. Given that the target register-setting was determined using bypass mode, the possible operational register-setting must be determined, such that, when the possible operational register-setting is provided to current controller 120 using non-bypass mode, current controller 120 will output approximately the target register-setting.

For another embodiment, the target register-setting determined in step 502 of FIG. 5 may be used directly as the possible operational register-setting in bypass mode. For this embodiment, when the operational VOL is required to be generated on a transmission line of bus 30, the target register-setting is output by current controller 120 to output logic circuitry 102.

Again with reference to FIG. 8, master 11 initializes a register-setting to zero at step 800. At step 802, the register-setting is sent from master 11 to slave 212. Using non-bypass mode, a current controller output is generated by current controller 120 in response to the register-setting.

At step 804, master 11 selects read circuitry 126 to provide the output of current controller 120 onto transmission line 111 and bus 30. At step 806, master 11 reads the output of current controller supplied by read circuitry 126 (and current mode driver 100) and determines how close the output of current controller 120 is to the previously determined target register-setting. For one embodiment, only those outputs of current controller 120 which are close to the target register-setting are saved by master 11. Register-settings that yield output of current controller 120 furthest away from the target register-setting are unreliable when compared with register-settings that yield outputs of current controller 120 closer to the target register-setting. This is because the register-settings that yield outputs of current controller 120 furthest away from the target register-setting are register-settings that correspond to operational register-settings better suited to different operating conditions.

At step 808, master 11 determines if the maximum desired register-setting has been reached. If not, the register-setting is updated at step 810 and steps 802 through 808 are repeated. For one embodiment, register 322 of capacitor reference current controller 320 comprises five bits and steps 802 through 810 are executed up to 32 times in order to determine the output of capacitor reference current controller 320 associated with each possible register-setting for capacitor reference current controller 320. For another embodiment, register 322 comprises six bits and steps 802 through 810 are executed up to 64 times.

For one embodiment, the register-setting is updated and steps 802 through 810 are repeated only when step 808 determines that the current register-setting yields an output of current controller 120 that is less than the target register-setting.

When master 11 determines at step 808 not to update the register-setting, the possible operational register-setting is determined at step 812 from the register-settings saved by master 11. The possible operational register-setting comprises the register-setting which yields, or is associated with, an output of current controller 120 that is closest to the target register-setting. Various techniques may be used to determine which register-setting yields an output of current controller 120 closest to the target register-setting. One embodiment is illustrated in FIG. 9 below.

Figure 9:
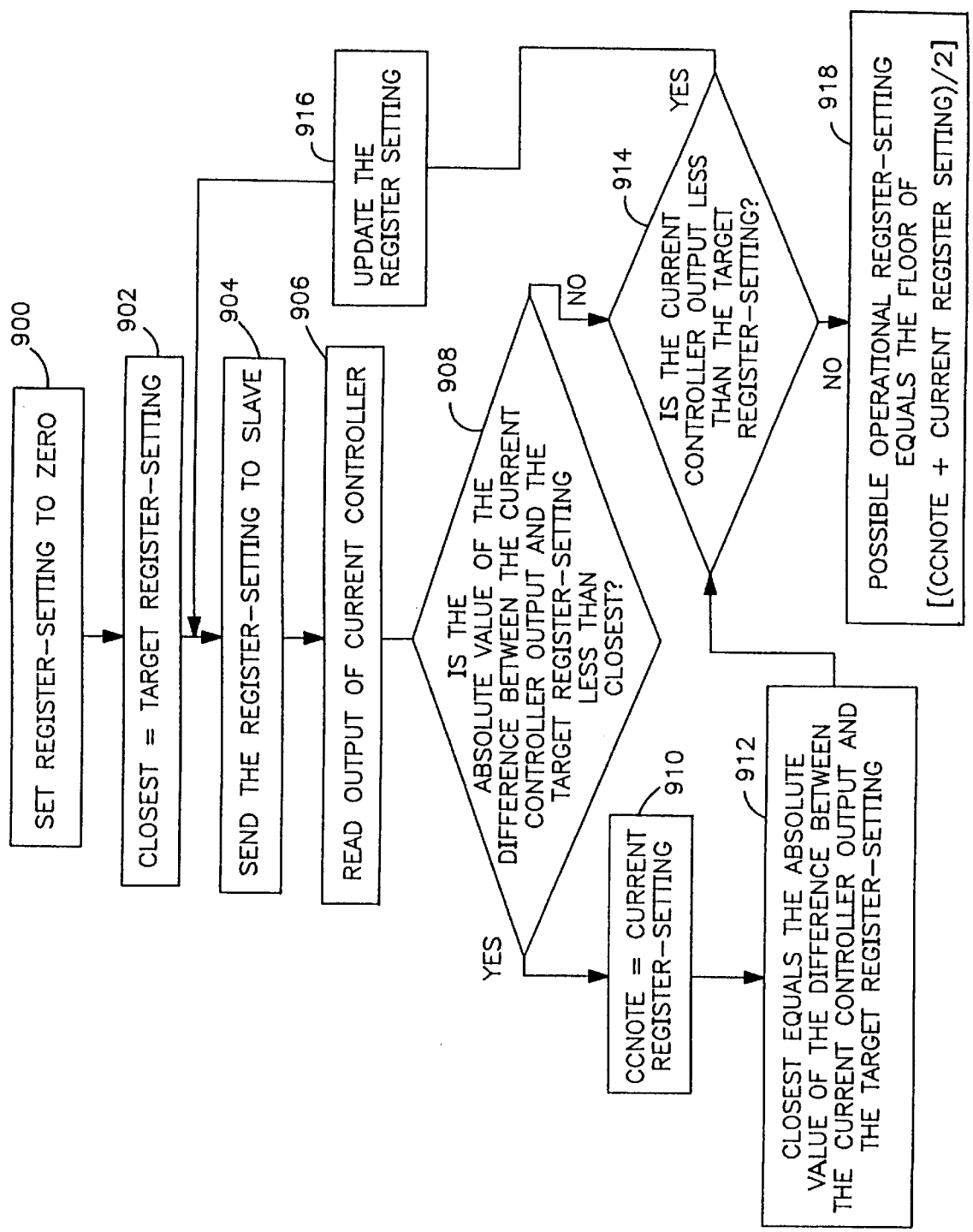
FIG. 9 is a flow chart of another embodiment for determining an operational register-setting.

FIG. 9 illustrates another embodiment for determining a possible operational register-setting for step 504 of FIG. 5. As described above, step 504 comprises the second phase for determining a possible operational register-setting based on a target register-setting. Given that the target register-setting was determined using bypass mode, the possible operational register-setting must be determined, such that, when the possible operational register-setting is provided to current controller 120 using non-bypass mode, current controller 120 will yield the target register-setting.

At step 900, master 11 initializes a register-setting to zero. At step 902, master 11 initializes CLOSEST. CLOSEST records the smallest absolute value of the difference between the output of current controller 120 (generated is response to the register-setting sent to slave 212) and the target register-setting. CLOSEST may be initially set to any arbitrarily large number. For one embodiment, step 902 initializes CLOSEST to the target register-setting.

At step 904, the register-setting is sent from master 11 to slave 212 and provided to current controller 120. Using the non-bypass mode, a current controller output is generated by current controller 120 in response to the register-setting. At step 906, master 11 selects read circuitry 126 to provide the current controller output onto transmission line 111 and bus 30. Master 11 reads the current controller output supplied by read circuitry 126 (and current mode driver 100).

At step 908, a test is made to determine whether the absolute value of the difference between the current controller output and the target register-setting is less than CLOSEST. If so, then the register-setting is stored in CCNOTE at step 910. CCNOTE records the lowest register-setting which yields a current controller output having a value closest to the target register-setting. At step 912, CLOSEST is updated to the absolute value of the difference between the current controller output and the target register-setting.

If, at step 908, master 11 determines that the absolute value of the difference between the current controller output and the target register-setting is not less than CLOSEST, or after step 912, then master 11 determines whether the current controller output is less than the target register-setting at step 914. If the current controller output is less than the target register-setting, the register-setting is incremented at step 916. Steps 904 through 916 are repeated until the current controller output generated in response to the current register-setting is greater than or equal to the target register-setting.

When the current controller output is greater than or equal to the target register-setting, master 11 determines the possible operational register-setting for slave 212 at step 918. For one embodiment, master 11 adds CCNOTE to the register-setting that yielded the current controller output having a value greater than or equal to the target register-setting. The sum is divided by two, and master 11 sets the possible operation register-setting equal to the floor of this result. That is, the result of CCNOTE plus the register-setting is divided by two and then rounded down to the nearest whole number.

Figure 10:
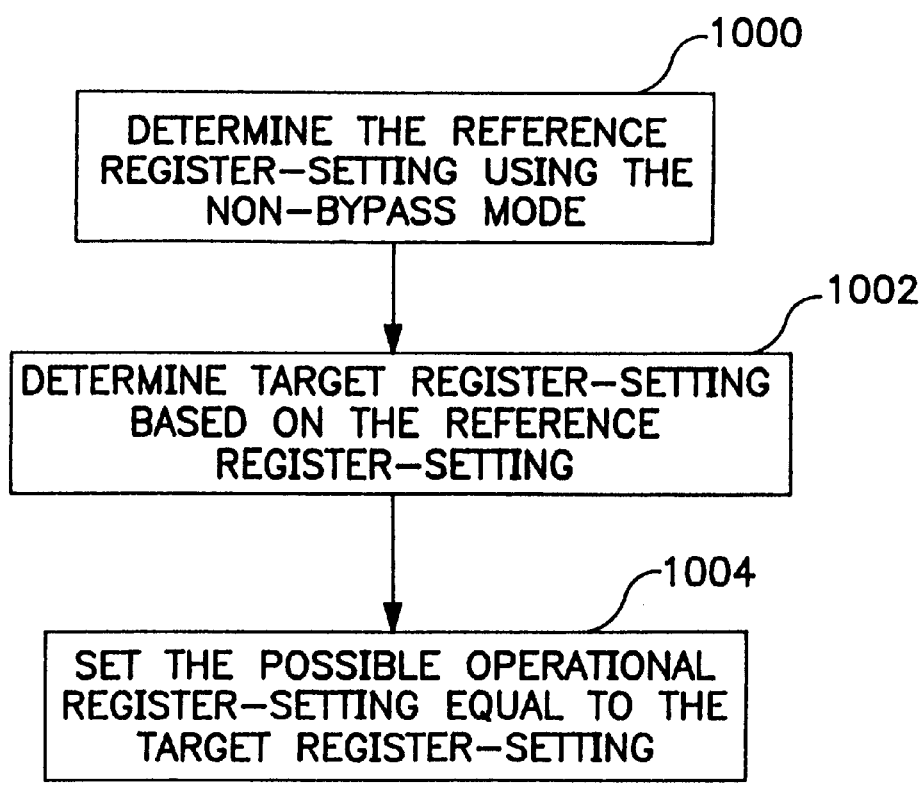
FIG. 10 is a flow chart of another embodiment for determining a possible operational register-setting for step 402 of FIG. 3.

FIG. 10 is a flow chart of another embodiment for determining a possible operational register-setting for step 402 of FIG. 4. The method illustrated in FIG. 10 may stand on its own, that is, the possible operational register-setting generated by the method of FIG. 10 may be used as the operational register-setting for current controller 120.

At step 1000, master 11 determines a reference register-setting for current controller 120 using non-bypass mode. As described above with respect to FIG. 5, a reference register-setting comprises a register-setting that causes output driver 100 to set a current and generate a voltage on transmission line 111 (and bus 30) that approximately equals Vref.

For the embodiment of current controller 320 illustrated in FIG. 3, the reference register-setting is loaded into register 322. This causes selective capacitors in capacitor array 163 to be coupled to line 167 and causes counter 159 to count to a value which is coupled to output logic circuitry 102 and transistor array 101. Subsequently a current and a voltage are generated on transmission line 111 (and/or the other transmission lines of bus 30) which approximately equals Vref.

Embodiments for determining the reference register-setting for slave 212 using non-bypass mode are described in FIGS. 6, 7, and 11. FIGS. 6, 7, and 11 have been described in detail above with respect to bypass mode and the first method generally shown in FIG. 5. With reference to FIG. 6, a register-setting is initialized at step 600. At step 602, SUMFAILED is set to zero. At step 604, the register-setting is sent from master 11 to slave 212 and provided to current controller 120. Using non-bypass mode, the register-setting causes current controller 120 to generate an output on lines 103a–103e. The output on lines 103a–103e may not equal the register-setting. The output on lines 103a–103e causes a current and a voltage to be generated on transmission line 111 (and bus 30). The balance of the steps illustrated in FIGS. 6 and 7 are as previously described.

With reference to FIG. 11, a register-setting is initialized at step 1100. At step 1102, PREVPASS is set to zero. At step 1104, SUM is set to zero. At step 1106, the register-setting is sent from master 11 to slave 212 and provided to current controller 120. Using non-bypass mode, the register-setting causes current controller 120 to generate an output on lines 103a–103e. The output on lines 103a–103e may not equal the register-setting. The output on lines 103a–103e causes a current and a voltage to be generated on transmission line 111 (and bus 30). The balance of the steps illustrated in FIGS. 11 and 7 are as previously described.

At step 1002, a target register-setting is determined based on the reference register-setting. The target register-setting for the non-bypass method illustrated in FIG. 10, is a register-setting that when provided to current controller 120 causes current controller 120 to generate an output on lines 103a–103e which results in setting a current and generating a voltage approximately equal to the operational VOL on transmission line 111. Vterm (VOH) and the operational VOL provide a substantially symmetric voltage swing about Vref.

In order to achieve a substantially symmetric voltage swing about Vref, the target register-setting does not simply comprise twice the reference register-setting determined at step 1000. The parasitic capacitance of the capacitors 191a–191e in capacitor array 163, as well as, other non-ideal circuit characteristics of the other circuit elements illustrated in FIG. 3, must be taken into account. Therefore, a more sophisticated approach for determining the target register-setting is required.

For one embodiment, an offset representing the parasitic capacitance and other non-ideal circuit characteristics is added to the reference register-setting determined in step 1000. For one embodiment, the offset value is three. This result is then multiplied by the multiplier SWINGMULTIPLIER and the offset is subtracted from the result. As described above with respect to step 502 of FIG. 5, SWINGMULTIPLIER is a predetermined number which accounts for non-ideal current source characteristics of transistors 101a–101e of output transistor array 101. For one embodiment, SWINGMULTIPLIER is approximately 2.2. For another embodiment, SWINGMULTIPLIER is approximately 2.15.

For another embodiment, the operational VOL and Vterm (VOH) may not be symmetrically positioned about VREF. For this embodiment, the value of SWINGMULTIPLIER may comprise a value which achieves the desired relationship between Vterm (VOH), the operational VOL, and Vref.

At step 1004, the possible operational register-setting is set to the target register-setting. The possible operational register-setting may then be used by the method illustrated in FIG. 4.

For another embodiment, once the possible operational register-setting and the operational register-setting have been determined using the non-bypass mode, a value of the output of current controller 120 associated with the operational register-setting may be determined. This may be determined by loading the operational register-setting current controller 120 and then using read circuitry 126 to read out the resulting output of current controller 120. When the operational VOL is required to be generated on a transmission line of bus 30, the resulting output of current controller 120 may then be loaded provided to current controller 120 and, using the bypass mode, directly provided to output logic circuitry 102.

The methods illustrated in FIGS. 4 through 11 for setting a current for a current mode driver 100, which may be incorporated into master 11, current calibrator 40, or into slaves 12a–12n of FIG. 1, may also be used in other types of output drivers. For example, the method may be used for the output drivers illustrated in U.S. Pat. No. 5,254,883 of Horowitz.

It will be appreciated that for the methods illustrated in FIGS. 4 through 11, register 322 may also comprise two registers. For one embodiment, one register is used for the non-bypass method and the other register is used for the bypass method.

It will also be appreciated that the methods illustrated in FIGS. 4 through 11 may be used to set a current for a plurality of signal lines which connect master and slave devices in a point-to-point arrangement.

The methods illustrated in FIGS. 4 through 11 may also be used to set an operating current of a current source in either a slave or master device for a bus architecture that includes a modular bus with single or double termination. The modular bus includes a terminated motherboard data net for communicating data signals between a master and one or more motherboard slaves. A socket is used for coupling the data signals between the motherboard data net and a terminated module data net of a removable module. The module data net communicates the data signals between the master and one or more module devices affixed to the removable module. The module device may comprise slave devices. The data signal swing and level of reflection of the data signals are substantially independent of the presence of the module. The modular bus has a known fixed impedance when the removable module is not coupled to the terminated motherboard data net. When the removable module is coupled to the terminated motherboard data net the impedance of the modular bus is altered in a known amount.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a system comprising a current controlling device and a plurality of signal lines coupled to the current controlling device, the current controlling device having an output driver including a register, a method for setting a current of the output driver for one of the plurality of signal lines, the method comprising the steps of:
    (A) determining a reference register-setting;
    (B) determining a target register-setting based on the reference register-setting;
    (C) determining an operational register-setting based on the target register-setting, comprising the steps of:
        (1) determining a possible operational register-setting based on the target register-setting;
        (2) repeating steps (A) through (C)(1) a predetermined number of times to produce a plurality of possible operational register-settings;
        (3) determining a measure of central tendency of the plurality of possible operational register-settings; and
    (D) setting the current of the output driver for the one of the plurality of signal lines based on the operational register-setting.

2. The method of claim 1, wherein step (D) comprises coupling selective ones of a plurality of capacitors to an output of a current mirror of the output driver based upon the operational register-setting.

3. The method of claim 1, wherein step (C)(3) comprises statistically determining the operational register-setting based on the plurality of operational register-settings.

4. The method of claim 1, wherein step (B) comprises multiplying the reference register-setting by a predetermined multiplier.

5. The method of claim 1, wherein the output driver has non-ideal current source characteristics, and wherein step (B) comprises multiplying the reference register-setting by the predetermined multiplier.

6. The method of claim 1, wherein step (C) comprises setting the operational register-setting equal to the target register-setting.

7. The method of claim 1, wherein the plurality of signal lines comprise a bus.

8. The method of claim 7, wherein the bus has a known fixed impedance.

9. The method of claim 7, wherein the bus has a known alterable impedance.

10. The method of claim 9, wherein the known alterable impedance is altered by coupling a removable module to the bus.

11. The method of claim 10, wherein the removable module comprises a module device affixed to the module.

12. The method of claim 11, wherein the module device is a memory device.

13. The method of claim 12, wherein the memory device is a dynamic random access memory device.

14. In a system comprising a current controlling device and a plurality of signal lines coupled to the current controlling device, the current controlling device having an output driver including a register, a method for setting a current of the output driver for one of the plurality of signal lines, the method comprising the steps of:
    (A) determining a reference register-setting, comprising the steps of:
        (1) generating a plurality of voltages on the plurality of signal lines for a first amount of time in response to a register-setting;
        (2) incrementally altering the register-setting a number of times;
        (3) obtaining for each register-setting in the altering step an indicator equal to a number of voltages in the plurality of voltages which fail a comparison with a reference voltage; and
        (4) determining the reference register-setting based on the indicators;
    (B) determining a target register-setting based on the reference register-setting;
    (C) determining an operational register-setting based on the target register-setting; and
    (D) setting the current of the output driver for the one of the plurality of signal lines based on the operational register-setting.

15. The method of claim 14, wherein step (A)(1) further comprises:
    (a) providing the register-setting to a current controller;
    (b) generating an output from the current controller; and
    (c) coupling the output of the current controller to a particular combination of a plurality of transistors coupled between the plurality of signal lines and ground.

16. The method of claim 14, wherein step (A)(1) comprises:
    (a) initializing the current controlling device to enable the output driver to set an output current for the plurality of signal lines;
    (b) requesting the current controlling device to enable the output driver to set the output current for the plurality of signal lines; and
    (c) selecting a particular combination of a plurality of transistors coupled between the plurality of signal lines and ground based upon the register-setting in order to generate the plurality of voltages on the plurality of signal lines.

17. The method of claim 14, wherein step (A)(2) comprises:
    incrementally altering the register-setting until the plurality of voltages surpasses the reference voltage.

18. The method of claim 14, wherein step (A)(3) comprise:
(a) comparing for each register-setting the plurality of voltages with the reference voltage after a second amount of time, wherein the second amount of time is less than the first amount of time; and
(b) setting the indicator equal to the number of voltages in the plurality of voltages that fail the comparison with the reference voltage.

19. The method of claim 14, wherein step (A)(3) comprises:
(a) sampling for each register-setting the plurality of voltages a plurality of times to produce a plurality of samples;
(b) comparing at least one of the plurality of samples with the reference voltage; and
(c) setting the indicator equal to the number of voltages in the plurality of voltages which fail the comparison with the reference voltage.

20. The method of claim 14, wherein one of the plurality of voltages fails the comparison with the reference voltage in step (A)(3) when the one of the plurality of voltages equals the reference voltage.

21. The method of claim 14, wherein one of the plurality of voltages fails the comparison with the reference voltage in step (A)(3) when the one of the plurality of voltages surpasses the reference voltage.

22. The method of claim 14, wherein step (A)(4) comprises:
setting the reference register-setting equal to an approximation of a register-setting that corresponds to a transition of the indicators from a first value to a second value.

23. The method of claim 14, wherein step (A)(4) comprises:
setting the reference register-setting equal to a register-setting that corresponds to a measure of central tendency of a transition of the indicators from a first value to a second value.

24. The method of claim 14, wherein step (A)(4) comprises:
(a) accumulating the indicators into a first number;
(b) dividing the first number by a second number to produce a measure of central tendency; and
(c) setting the reference register-setting equal to the measure of central tendency minus a bias number.

25. The method of claim 15, wherein the output of the current controller comprises the register-setting.

26. The method of claim 15, wherein step (A)(1)(b) comprises:
(i) coupling selective ones of a plurality of capacitors to an output of a current mirror of the current controller based upon the register-setting;
(ii) charging the selective ones of the plurality of capacitors to a variable voltage while a counter counts;
(iii) comparing the variable voltage to the reference voltage; and
(iv) when the variable voltage approximately equals the reference voltage, stopping the counter from counting and latching the output of the current controller.

27. The method of claim 16, wherein the current controlling device includes a storage element and step (A)(1)(a) comprises storing assertion data into the storage element.

28. The method of claim 18, wherein the second amount of time is of a sufficient duration that the plurality of voltages have stabilized on the plurality of signal lines.

29. The method of claim 14, wherein one of the plurality of voltages fails the comparison with the reference voltage in step (A)(3) when the one of the plurality of voltages does not surpass the reference voltage.

30. The method of claim 29, wherein the one of the plurality of voltages does not surpass the reference voltage when the one of the plurality of voltages is less than the reference voltage.

31. The method of claim 29, wherein the one of the plurality of voltages does not surpass the reference voltage when the one of the plurality of voltages is greater than the reference voltage.

32. The method of claim 22, wherein the first value is greater than the second value.

33. The method of claim 22, wherein the first value is less than the second value.

34. The method of claim 22, wherein the first value has a first associated register-setting and the second value has a second associated register-setting.

35. The method of claim 27, wherein step (A)(1)(b) comprises requesting the current controlling device to read the assertion data from the storage element.

36. The method of claim 34, wherein reference register-setting is the first associated register-setting or the second associated register-setting.

37. In a system comprising a current controlling device and a plurality of signal lines coupled to the current controlling device the current controlling device having an output driver including a register a method for setting a current of the output driver for one of the plurality of signal lines, the method comprising the steps of:
(A) determining a reference register-setting comprising the steps of;
(1) sending a register-setting to the register;
(2) initializing the current controlling device to enable the output driver to set an output current for the plurality of signal lines;
(3) requesting the current controlling device to enable the output driver to set the output current for the plurality of signal lines;
(4) selecting a particular combination of a plurality of transistors coupled between the plurality of signal lines and ground based upon the register-setting in order to generate a plurality of voltages on the plurality of signal lines;
(5) comparing the plurality of voltages with a reference voltage and generating an indicator in response thereto;
(6) accumulating the indicator into a first number;
(7) repeating steps (3) through (6) a predetermined number of times;
(8) accumulating the first number into a second number;
(9) comparing the first number with a first predetermined number;
(10) updating the register-setting if the first number does not equal the first predetermined number;
(11) repeating steps (1) through (10) until the first number equals the first predetermined number; and
(12) determining the reference register-setting based upon the second number and a second predetermined number,
(B) determining a target register-setting based on the reference register-setting;
(C) determining an operational register-setting based on the target register-setting: and
(D) setting the current of the output driver for the one of the plurality of signal lines based on the operational register-setting.

38. The method of claim 37, wherein the first predetermined number is zero.

39. The method of claim 37, wherein step (A)(12) further comprises dividing the second number by the second predetermined number and subtracting a bias number.

40. The method of claim 39, wherein the plurality of signal lines comprises eight data lines, the predetermined number of times is ten times, the second predetermined number is 80 and the bias number is one-half.

41. In a system comprising a current controlling device and a plurality of signal lines coupled to the current controlling device, the current controlling device having an output driver including a register, a method for setting a current of the output driver for one of the plurality of signal lines the method comprising the steps of:

(A) determining a reference register-setting;

(B) determining a target register-setting based on the reference register-setting comprising the steps of:
  (1) adding an offset value to the reference register-setting to produce a first result;
  (2) multiplying the first result by a multiplier to produce a second result; and
  (3) subtracting the offset value from the second result to produce the target register-setting (C) determining an operational register-setting based on the target register-setting; and (D) setting the current of the output driver for the one of the plurality of signal lines based on the operational register-setting.

42. In a system comprising a current controlling device and a plurality of signal lines coupled to the current controlling device, the current controlling device having an output driver including a register, a method for setting a current of the output driver for one of the plurality of signal lines, the method comprising the steps of:

(A) determining a reference register-setting:

(B) determining a target register-setting based on the reference register-setting;

(C) determining an operational register-setting based on the target register-setting, comprising the steps of:
  (1) generating a plurality of output values from a current controller in response to a plurality of register-settings in the current controlling device;
  (2) comparing the plurality of output values to the target register-setting; and
  (3) setting the operational register-setting equal to one of the plurality of register-settings that results in one of the plurality of output values that is closest to the target register-setting; and (D) setting the current of the output driver for the one of the plurality of signal lines based on the operational register-setting.

43. The method of claim 42, wherein step (C)(1) comprises:
(a) loading a register-setting into the register;
(b) storing an output value in response to step (a);
(c) updating the register-setting; and
(d) repeating steps (C)(1)(a) through (C)(1)(c) a predetermined number of times.

44. The method of claim 42, wherein step (C)(1) comprises:
(a) sending a register-setting to the register;
(b) coupling selective ones of a plurality of capacitors to an output of a current mirror of the current controller based upon the register-setting;
(c) charging the selective ones of the plurality of capacitors to a variable voltage while the counter counts;
(d) comparing the variable voltage to a reference voltage;
(e) when the variable voltage approximately equals the reference voltage, stopping the counter from counting and latching a count of the counter, wherein the count of the counter is one of the plurality of output values;
(f) updating the register-setting; and
(g) repeating steps (C)(1)(a) through (C)(1)(f) a predetermined number of times to produce the plurality of output values.

45. The method of claim 44, wherein step (C)(1)(e) comprises storing the count.

46. The method of claim 44, wherein step (C)(1)(e) comprises storing the count when the count is within a predetermined range of the target register-setting.

47. In a system comprising a current controlling device and a plurality of signal lines coupled to the current controlling device, the current controlling device having an output driver including a register, a method for setting a current of the output driver for one of the plurality of signal lines, the method comprising the steps of:

(A) determining a reference register-setting;

(B) determining a target register-setting based on the reference register-setting;

(C) determining an operational register-setting based on the target register-setting, comprising the steps of:
  (1) sending a register-setting to the register;
  (2) generating an output value from a current controller in response to the register-setting;
  (3) comparing the output value with the target register-setting;
  (4) if the output value is less than the target register-setting, then updating the register-setting;
  (5) repeating steps (1) through (4) until the output value is greater than or equal to the target register-setting; and
  (6) setting the operational register-setting equal to the register-setting; and (D) setting the current of the output driver for the one of the plurality of signal lines based on the operational register-setting.

48. In a system comprising a current controlling device and a plurality of signal lines coupled to the current controlling device, the current controlling device having an output driver including a register, a method for setting a current of the output driver for one of the plurality of signal lines, the method comprising the steps of:

(A) determining a reference register-setting;

(B) determining a target register-setting based on the reference register-setting;

(C) determining an operational register-setting based on the target register-setting. Compromising the steps of:
  (1) setting a variable equal to the target register-setting;
  (2) sending a register-setting to the register;
  (3) generating an output value from a current controller in response to the register-setting;
  (4) comparing the variable with the absolute value of the target register-setting minus the output value;
  (5) if the absolute value of the target register-setting minus the output value is less than the variable, then setting a currently closest register-setting equal to the register-setting and replacing the variable with the absolute value of the target register-setting minus the output value;

(6) if the output value is less than the target register-setting, then updating the register-setting;

(7) if the output value is less than the target register-setting, repeating steps (2) through (6) until the output value is greater than or equal to the target register-setting; and (8) setting the operational register-setting equal to a floor of a halved first quantity, wherein the first quantity is the sum of the currently closest register-setting and the register-setting; and (D) setting the current of the output driver for the one of the plurality of signal lines based on the operational register-setting.

49. In a bus system comprising a bus, a master, and a slave with an output driver including a register, a method for setting a current of the output driver for the bus, the method comprising the steps of:

(A) sending a first register-setting from the master to the register of the slave;

(B) selectively coupling the first register-setting to a plurality of transistors coupled between the bus and ground;

(C) selecting a particular combination of the plurality of transistors based upon the first register-setting in order to generate a plurality of voltages on the bus;

(D) sampling each of the plurality of voltages a plurality of times to produce a plurality of sample sets;

(E) comparing each of the plurality of voltages of one of the plurality of sample sets with a reference voltage and setting a fail number equal to a number of the plurality of voltages which fail the comparison;

(F) repeating steps (D) and (E) a first predetermined number of times;

(G) updating the first register-setting if the fail number does not equal a check number (H) repeating steps (A) through (G) until the fail number equals the check number;

(I) if the fail number equals the check number, then setting a target register-setting equal to the first register-setting multiplied by a multiplier;

(J) sending a second register-setting from the master to the register of the slave;

(K) generating an output value from a current controller in response to the second register-setting;

(L) storing the output value associated with the second register-setting when the output value is within a predetermined range of the target register-setting;

(M) updating the second register-setting and repeating steps (I) through (L) a second predetermined number of times;

(N) determining an operational register-setting based on the second register-setting having an associated output value closest to the target register-setting; and (O) setting the current of the output driver for the bus based on the operational register-setting.

50. The method of claim 49, wherein step (O) comprises the steps of:

(1) repeating steps (A) through (N) a third predetermined number of times to produce a plurality of possible operational register-settings; and (2) determining the operational register-setting based on the plurality of possible operational register-settings.

51. In a bus system comprising a bus, a master, and a slave with an output driver including a register, a method for setting a current of the output driver for the bus, the method comprising the steps of:

(A) sending a register-setting from the master to the register of the slave;

(B) generating an output value from a current controller in response to the register-setting;

(C) selecting a particular combination of a plurality of transistors coupled between the bus and ground based upon the output value in order to generate a plurality of voltages on the bus;

(D) sampling each of the plurality of voltages a plurality of times to produce a plurality of sample sets;

(E) comparing each of the plurality of voltages of one of the plurality of sample sets with a reference voltage and setting a fail number equal to a number of the plurality of voltages which fail the comparison;

(F) repeating steps (D) and (E) a first predetermined number of times;

(G) updating the register-setting if the fail number does not equal a check number;

(H) repeating steps (A) through (G) until the fail number equals the check number;

(I) determining a target register-setting based on the register-setting; and (J) setting the current of the output driver for the bus based on the target register-setting.

52. The method of claim 51, wherein step (J) comprises the steps of:

(1) repeating steps (A) through (I) a second predetermined number of times to produce a plurality of target register-settings;

(2) determining an operational register-setting based on the plurality of target register-settings; and (3) setting the current of the output driver for the bus based on the operational register-setting.

53. A medium readable by a digital signal processing device in a bus system having a bus and a slave, the slave having an output driver including a register, the medium storing sequences of instructions for setting a current of the output driver for the bus, wherein the sequences of instructions cause the digital signal processing device to:

(A) determine a reference register-setting;

(B) determine a target register-setting based on the reference register-setting;

(C) determine an operational register-setting based on the target register-setting comprising the steps of:

(1) determining a possible operational register-setting based on the target register-setting;

(2) repeating steps (A) through (C)(1) a predetermined number of times to produce a plurality of possible operational register-settings;

(3) determining a measure of central tendency of the plurality of possible operational register-settings; and; and (D) setting the current of the output driver for the bus based on the operational register-setting.

54. An output driver for an electronic device coupled to a bus, comprising:

a plurality of transistors coupled to bus to control bus current; control circuitry coupled to the transistors;

and a current controller coupled to the control circuitry, the current controller comprising:

a comparison circuit having a first input to receive a reference voltage, and a second input to receive a variable voltage;

a capacitor circuit configured to generate the variable voltage;

a multiplexer having first inputs to receive a register-setting, and second inputs, and outputs coupled to control circuitry;

a counter having outputs coupled to the second inputs of the multiplexer; and control logic coupled to the counter, the comparison circuit, and the multiplexer, the control logic for causing the counter to count until the comparison circuit determines that the variable voltage is in a predetermined relationship with the reference voltage.

55. The output driver of claim 54, wherein the control logic further causes the multiplexer to output either the register-setting or the count of the counter.

* * * * *